United States Patent [19]
Horii

[11] Patent Number: 6,018,363
[45] Date of Patent: *Jan. 25, 2000

[54] IMAGE SENSING APPARATUS WITH OPTICAL-AXIS DEFLECTING DEVICE

[75] Inventor: Hiroyuki Horii, Hiratsuka, Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/426,834

[22] Filed: Apr. 24, 1995

[30] Foreign Application Priority Data

| Apr. 28, 1994 | [JP] | Japan | 6-091691 |
| May 20, 1994 | [JP] | Japan | 6-106645 |
| May 20, 1994 | [JP] | Japan | 6-106646 |

[51] Int. Cl.$^7$ .......................... H04N 5/225; H04N 5/335; H04N 5/228

[52] U.S. Cl. .......................... 348/219; 348/220; 348/222; 348/279; 348/335; 348/369

[58] Field of Search .................. 348/207, 208, 348/219–220, 222, 224, 228, 229, 230, 264, 266, 270, 271, 272, 273, 274, 275, 276, 277, 279, 335, 344, 369, 340, 343; H04N 5/225, 9/07, 5/335, 5/228

[56] References Cited

U.S. PATENT DOCUMENTS

| 5,282,043 | 1/1994 | Cochard et al. | 358/213.28 |
| 5,293,240 | 3/1994 | Matsunaga | 348/312 |
| 5,363,136 | 11/1994 | Sztanko et al. | 348/207 |
| 5,402,171 | 3/1995 | Tagami et al. | 348/219 |
| 5,418,564 | 5/1995 | Aoki et al. | 348/264 |
| 5,477,335 | 12/1995 | Tai | 358/298 |
| 5,485,204 | 1/1996 | Taniji | 348/264 |
| 5,557,327 | 9/1996 | Hasegawa et al. | 348/340 |
| 5,734,424 | 3/1998 | Sasaki | 348/222 |

*Primary Examiner*—Tuan Ho
*Assistant Examiner*—Ngoc-Yen Vu
*Attorney, Agent, or Firm*—Fitzpatrick, Cella, Harper & Scinto

[57] ABSTRACT

An image taking apparatus includes an image taking sensor 10 having a high-resolution mode and a normal mode; synchronous signal generators 7 and 8 for generating synchronous signals corresponding to the high-resolution mode and the ordinary mode, respectively; a first memory 17 for storing image signals taken in the high-resolution mode; a second memory 35 for storing image signals taken in the normal mode; and a video signal encoder 33 for processing the image signals stored in the second memory 35 in accordance with a predetermined image signal system, wherein, in the high-resolution mode, image signals are stored in the first memory 17 to output digital image signals, and, in the normal mode, image signals are stored in the second memory 35, video signals 34 being output from the encoder 33.

8 Claims, 18 Drawing Sheets

FIG. 2

| Cy | Ye | Cy | Ye | Cy | Ye | Cy | Ye |
|----|----|----|----|----|----|----|----|
| Gr | Mg | Gr | Mg | Gr | Mg | Gr | Mg |
| Cy | Ye | Cy | Ye | Cy | Ye | Cy | Ye |
| Mg | Gr | Mg | Gr | Mg | Gr | Mg | Gr |
| Cy | Ye | Cy | Ye | Cy | Ye | Cy | Ye |
| Gr | Mg | Gr | Mg | Gr | Mg | Gr | Mg |
| Cy | Ye | Cy | Ye | Cy | Ye | Cy | Ye |
| Mg | Gr | Mg | Gr | Mg | Gr | Mg | Gr |

FIG. 6

| Cy 1,1 | Ye 2,1 | Cy 3,1 | Ye 4,1 | Cy 5,1 | Ye 6,1 | Cy 7,1 | Ye 8,1 |
|---|---|---|---|---|---|---|---|
| Gr 1,2 | Mg 2,2 | Gr 3,2 | Mg 4,2 | Gr 5,2 | Mg 6,2 | Gr 7,2 | Mg 8,2 |
| Cy 1,3 | Ye 2,3 | Cy 3,3 | Ye 4,3 | Cy 5,3 | Ye 6,3 | Cy 7,3 | Ye 8,3 |
| Mg 1,4 | Gr 2,4 | Mg 3,4 | Gr 4,4 | Mg 5,4 | Gr 6,4 | Mg 7,4 | Gr 8,4 |
| Cy 1,5 | Ye 2,5 | Cy 3,5 | Ye 4,5 | Cy 5,5 | Ye 6,5 | Cy 7,5 | Ye 8,5 |
| Gr 1,6 | Mg 2,6 | Gr 3,6 | Mg 4,6 | Gr 5,6 | Mg 6,6 | Gr 7,6 | Mg 8,6 |
| Cy 1,7 | Ye 2,7 | Cy 3,7 | Ye 4,7 | Cy 5,7 | Ye 6,7 | Cy 7,7 | Ye 8,7 |
| Mg 1,8 | Gr 2,8 | Mg 3,8 | Gr 4,8 | Mg 5,8 | Gr 6,8 | Mg 7,8 | Gr 8,8 |

FIG. 10(a)

| C | Y | C | Y | C | Y |
|---|---|---|---|---|---|
| G | M | G | M | G | M |
| C | Y | C | Y | C | Y |
| M | G | M | G | M | G |
| C | Y | C | Y | C | Y |
| G | M | G | M | G | M |

FIG. 10(b)

| C | Y | C | Y | C | Y |
|---|---|---|---|---|---|
| G | M | G | M | G | M |
| C | Y | C | Y | C | Y |
| M | G | M | G | M | G |
| C | Y | C | Y | C | Y |
| G | M | G | M | G | M |

FIG. 10(c)

| C | Y | C | Y | C | Y |
|---|---|---|---|---|---|
| G | M | G | M | G | M |
| C | Y | C | Y | C | Y |
| M | G | M | G | M | G |
| C | Y | C | Y | C | Y |
| G | M | G | M | G | M |

FIG. 10(d)

| C | Y | C | Y | C | Y |
|---|---|---|---|---|---|
| G | M | G | M | G | M |
| C | Y | C | Y | C | Y |
| M | G | M | G | M | G |
| C | Y | C | Y | C | Y |
| G | M | G | M | G | M |

IMAGE SENSING APPARATUS WITH OPTICAL-AXIS DEFLECTING DEVICE

BACKGROUND OF THE INVENTION

1. Field of the Invention

The present invention relates to an image taking apparatus, such as a video camera, that is equipped with an image taking device, such as a charge-coupled device (hereinafter referred to as "CCD").

2. Description of the Related Art

Conventional image taking apparatuses equipped with an image taking device, such as CCD, are used as a means for supplying information to a video monitor, a VTR (video tape recorder), etc. In such an image taking apparatus, a video signal (NTSC, PAL signal, etc.) is obtained by driving the image taking device in accordance with the frequency of the video signal. The number of pixels in one frame, that is, the number of effective pixels of the image taking device, is determined by the number of lines, frequency characteristics, etc. of the video signal. Thus, it is possible to check the taken image in real time by means of a video monitor or the like.

Recently, however, image taking devices which provide a still higher level of resolution than obtainable with video signals have been developed. In image taking apparatuses using such a high-resolution image taking device, it is possible to take images at high resolution due to the large number of pixels.

However, conventional image taking apparatuses using such a high-resolution image taking device, in which it is possible to take images at high resolution due to the large number of pixels, require, on the other hand, a monitor, printer, etc. adapted to high resolution. Thus, the taken image cannot be easily checked by a video monitor or the like as in the prior art.

SUMMARY OF THE INVENTION

The present invention has been made with a view toward solving the above problem in the prior art. It is an object of the present invention to provide an image taking apparatus which is capable of taking images at high resolution and which allows a standard image video signal to be output to a video monitor or the like and monitored.

To achieve this object, in accordance with an embodiment of the present invention, there is provided an image taking apparatus comprising: an image taking device for effecting photoelectric conversion of images; synchronous signal generating means for generating a synchronous signal for operating the image taking device in correspondence with each of a high-resolution mode and a normal mode; storage means for storing image signals obtained by processing the output from the image taking device; image signal output means for outputting the image signals stored in the storage means after processing them in accordance with a predetermined image signal system; and control means for selecting either the high-resolution mode or the normal mode to perform image taking, the number of pixels of the image taking device being large enough to enable images to be taken at high resolution, the control means supplying the synchronous signal from the synchronous signal generating means to the image taking device in correspondence with either the high-resolution mode or the normal mode to perform image taking, wherein, in the high-resolution mode, the image signals are stored in the storage means and digital image signals, and wherein, in the normal mode, the image signals are stored in the storage means and video signals are output from the image signal output means.

Due to the above construction, the image taking device, having a number of pixels which is large enough to enable image taking to be performed at high resolution, can take images in either the high-resolution mode or the normal mode in accordance with the synchronous signal output from the synchronous signal generating means and corresponding to the selected mode, and, in both modes, the image signals, obtained by processing the output from the image taking device, are stored in the storage means.

In the high-resolution mode, digital image signals having a high level of resolution are output. In the normal mode, video image signals processed in accordance with a predetermined image signal system are output by the image signal output means.

As described above, either the high-resolution mode or the normal mode can be selected for image taking, and image signals for image display according to the selected mode can be output. Further, in both modes, the taken images are recorded or stored, and, by reading these images and subjecting them to the requisite image signal processing, it is possible to check the images on a monitor.

In accordance with another embodiment of the present invention, there is provided an image taking apparatus comprising: an image taking sensor having at least first and second image taking modes and adapted to operate in two or more image taking modes; first signal processing means for effecting a predetermined signal processing on image signals output from the image taking sensor; storage means for storing the image signals output from the image taking sensor; second signal processing means for effecting a predetermined signal processing on the image signals stored in the storage means; and control means which, in the first image taking mode, causes the image signals supplied from the image taking sensor to be processed by the first signal processing means and which, in the second image taking mode, causes the image signals stored in the storage means to be processed by the second signal processing means.

In still another aspect of the present invention, there is provided an image taking apparatus comprising: an optical lens; an image taking sensor having at least first and second image taking modes and adapted to operate in two or more image taking modes; first image processing means for processing image signals taken by the image taking sensor; an A/D converter for A/D-converting the image signals taken by the image taking sensor; storage means for storing the image signals converted into digital signals by the A/D converter; second signal processing means for processing the digital image signals stored in the storage means; mode switching means for switching the mode for processing the image signals taken by the image taking sensor between the first and second image taking modes; and control means, which, when the first image taking mode is selected by the mode switching means, causes signal processing to be performed by the first signal processing means, and which, when the second image taking mode is selected by the mode switching means, causes signal processing to be performed by the second signal processing means.

In a still further aspect of the present invention, the image taking sensor simultaneously reads image taking data in an amount corresponding to two vertically adjacent lines, outputting a signal obtained by adding image signals corresponding to two vertically adjacent pixels when in the first image taking mode, and, when in the second image taking mode, outputs a signal for each pixel, without performing addition of image data.

In a still further aspect of the present invention, the image taking sensor is an image taking sensor using a complementary color mosaic filter.

In a still further aspect of the present invention, the image taking sensor is a CCD image taking device.

In a still further aspect of the present invention, there is provided an image taking apparatus comprising: an optical lens; optical-axis moving means for moving the optical axis of a light entering through the optical lens; optical-axis movement control means for controlling the operation of the optical-axis moving means; an image taking sensor having at least first and second image taking modes and adapted to operate in two or more image taking modes; first image processing means for performing a predetermined signal processing on image signals taken by the image taking sensor; an A/D converter for A/D-converting the image signals taken by the image taking sensor; storage means for storing the image signals converted into digital signals by the A/D converter; second signal processing means for performing a predetermined signal processing on the digital image signals stored in the storage means; and control means, which, in the first image taking mode, causes the predetermined signal processing to be performed by the first signal processing means, and which, in the second image taking mode, causes image taking to be performed a plurality of times while causing the optical-axis moving means to be controlled by the optical-axis movement control means, storing the thereby obtained image signals in the storage means, and, at the same time, causes the predetermined signal processing to be performed by the second signal processing means.

In a still further aspect of the present invention, the image taking sensor simultaneously reads image taking signals corresponding to two vertically adjacent lines, outputting a signal obtained by adding image signals corresponding to two vertically adjacent pixels when in the first image taking mode, and, when in the second image taking mode, outputs a signal for each pixel, without performing addition of image signals.

In a still further aspect of the present invention, the image taking sensor is an image taking sensor using a complementary color mosaic filter.

In a still further aspect of the present invention, the image taking sensor is a CCD image taking device.

In a still further aspect of the present invention, the optical-axis moving means is a variable-apex-angle prism.

In a still further aspect of the present invention, the optical-axis moving means is a lens shift, In a still further aspect of the present invention, the optical-axis moving means consists of a plane-parallel-plate rotating system.

In a still further aspect of the present invention, there is provided an image taking apparatus according to claims 1 through 11, wherein an image taking unit including an optical lens and an image taking sensor is separated from a signal processing unit which receives signals from the image taking unit and performs signal processing on the signals, with the two units being capable of being connected together through a cable.

In the image taking apparatus of the present invention, comprised of the technical means described above, the image taking sensor can be operated in either of the first and second image taking modes, and, at the same time, the signal processing at the subsequent stage is conducted in accordance with either of the two image taking modes, whereby not only can the normal signal processing be conducted and the results thereof displayed on the monitor, but also the output of each of the pixels of the image taking sensor is extracted to perform another kind of signal processing, such as resolution enhancement.

Further, by arranging the optical axis moving means directly before the image taking sensor, it is possible to perform image taking with pixel shift. Further, by executing signal processing for pixel shift on the image signals obtained by the image taking, it is possible to perform image taking at high resolution.

Further, it is possible to separate the camera head from the signal processing section, and the camera head is replaceable, whereby combination of an ordinary image taking camera, a camera adapted to pixel shift, etc. can be easily effected.

In still another aspect of the present invention, there is provided an image taking apparatus comprising: an image taking device having a predetermined number of pixels and adapted to effect photoelectric conversion on images formed by an optical lens; an A/D converter for effecting A/D conversion on image signals taken by the image taking device; a memory for storing image data obtained by the A/D conversion; a first color processing section for effecting color conversion on the image data stored in the memory; a first synchronous signal generator for generating a synchronous signal for controlling the image taking device, the A/D converter, the memory and the first color processing section; a second synchronous signal generator for generating a synchronous signal having a frequency different from that of the synchronous signal generated by the first synchronous signal generator; and a second color processing section which reads the image data stored in the memory with the synchronous signal generated by the second synchronous signal generator and performs color conversion on the image data.

The image taking device is driven by the synchronous signal of the first synchronous signal generator, and the image signal thereby obtained is A/D-converted and temporarily stored in the memory. The image signal thus stored is read by means of the synchronous signal of the first synchronous signal generator and color-converted by the first color processing section. Further, the memory is read with the synchronous signal of the second synchronous signal generator. Thus, even in the case of an image taking device having a large number of pixels and providing a high level of resolution, it is possible to check the taken image immediately after the image taking by means of the image signal which has been color-converted by the second color processing section.

Other objects and features of the present invention will become apparent from the following detailed description and the drawings.

BRIEF DESCRIPTION OF THE DRAWINGS

FIG. 2 illustrates a filter arrangement in an image taking sensor;

FIG. 6 is a diagram showing an example of a complementary-color-mosaic-filter arrangement in a single-plate image taking sensor;

FIG. 10 shows an example of an image taking with pixel shift;

DESCRIPTION OF THE PREFERRED EMBODIMENTS

The image taking apparatus of the present invention will now be described with reference to specific embodiments.
(First Embodiment)

Figure 1:
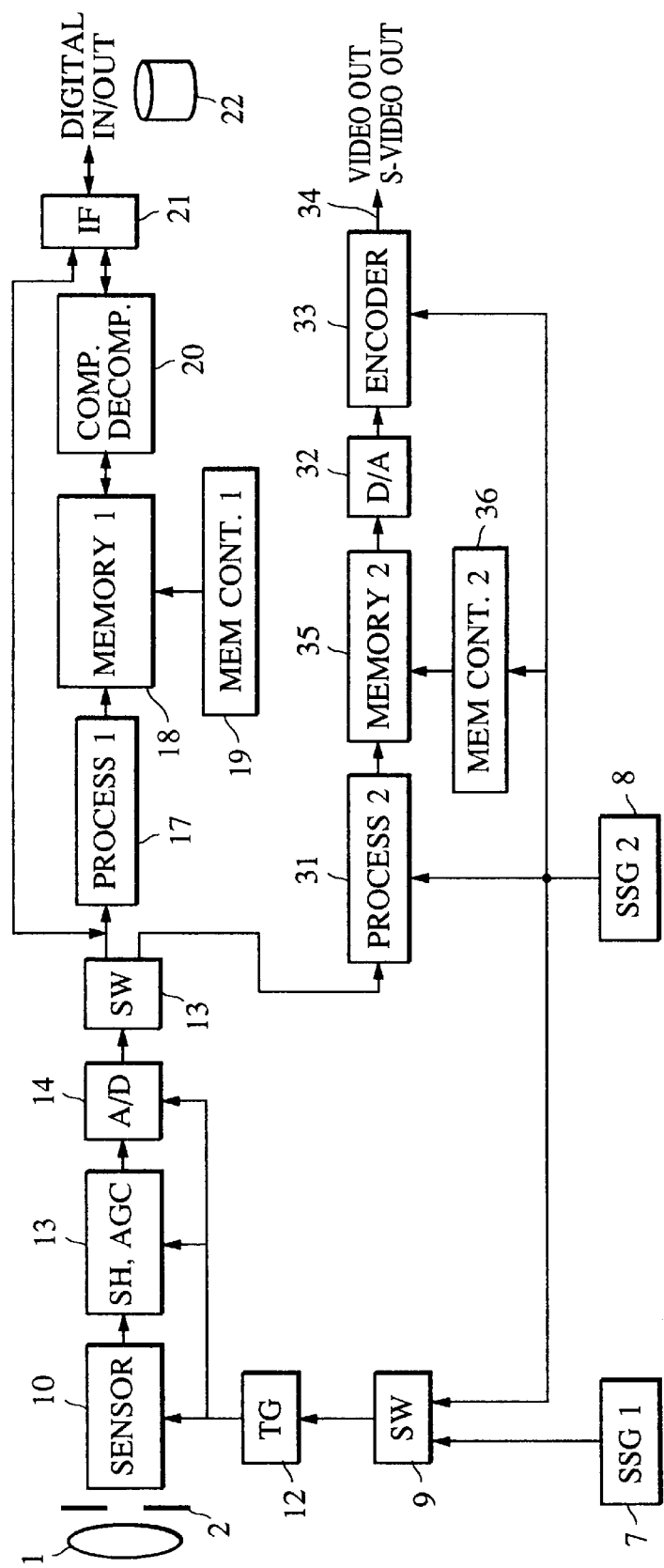
FIG. 1 is a block diagram showing a first embodiment of the present invention.

FIG. 1 is a block diagram showing the first embodiment of the present invention.

In FIG. 1, numeral 1 indicates a lens; numeral 2 indicates an aperture; numeral 7 indicates a first synchronous signal generator; numeral 8 indicates a second synchronous signal generator adapted to operate at video rate; numeral 9 indicates a switch for switching between the synchronous signals; numeral 10 indicates an image taking sensor; numeral 12 indicates a timing generator for generating timing pulses for operating the image taking sensor 10; numeral 13 indicates an SH,AGC circuit for performing sample-and-hold on the output of the image taking sensor 12 to effect AGC (automatic gain control); numeral 14 indicates an A/D converter; numeral 15 indicates a switch for switching the output of the A/D converter 14; numeral 17 indicates a first color processing section for conducting color processing; numeral 18 indicates a first memory for storing color-converted luminance two-color difference (YUV) data; numeral 19 indicates a first memory controller for controlling the first memory 18; numeral 20 indicates a compressor/expander for compressing/expanding luminance two-color difference (YUV) data; numeral 21 indicates an interface; numeral 22 indicates a storage device; numeral 31 indicates a second color processing section for performing color processing; numeral 32 indicates a D/A converter; numeral 33 indicates a video signal encoder; numeral 34 indicates a video output signal; numeral 35 indicates a second memory for storing the luminance two-color (YUV) data color converted by the second color processing section 31; and numeral 36 indicates a second memory controller for controlling the second memory 35.

The image taking sensor 10 is a solid-state image sensing device, such as CCD, and has a number of effective pixels of 1536×988, which is large enough to provide high resolution. This image taking sensor is a single-plate color sensor in which a complementary color mosaic filter (Cy, Mg, Ye, Gr) is attached to a chip. FIG. 2 shows an example of the layout of the complementary color mosaic filter (Cy, Mg, Ye, Gr) attached to the chip. In the image taking sensor 10, the switch 9 effects switching between synchronous signals having different frequencies that are respectively generated by the first and second synchronous signal generators 7 and 8, thereby enabling the image taking sensor 10 to operate in two image taking modes.

The second image taking mode will be explained first. The second synchronous signal generator 8 generates a synchronous signal for video signals (NTSC, PAL and the like). It effects thinning-out by reducing the apparent number of pixels through addition of pixels of the same filter arranged close to each other, or by skipping over part of the pixels when reading them from the image taking sensor 10. Alternatively, it reads only a particular storage area. In this way, it has the same access to data in the same way as in the case of video CCD, and reads 768×494 pixels in accordance with a video signal.

In accordance with the synchronous signal generated by the second synchronous signal generator 8, the timing generator 12 generates driving pulses for the image taking sensor 10. The image signal taken by the image taking sensor 10 is subjected to sample-and-hold and AGC (automatic gain control) for removing switching noise and extracting the signal component at the SH,AGC circuit 13, and converted to digital data by the 10-bit A/D converter 14. The image signal converted to digital data by the A/D converter 14 is transmitted through the switch 15, and is color-converted to luminance two-color difference (YUV) data by the second color processing section 31. This luminance two-color difference (YUV) data is stored in the second memory 35 under the control of the second memory controller 36. The luminance two-color difference (YUV) data, which is temporarily stored in the memory 35, is converted to an analog signal by the D/A converter 32, and modulated into a video signal by the encoder 33 to be output as the video signal 34 and displayed on a video monitor (not shown) or the like.

Here, the luminance two-color difference (YUV) data color-converted by the second color processing section 31 is first stored in the second memory 35, and then read to be transmitted to the D/A converter 32. However, it is also possible to transmit the luminance two-color difference (YUV) data, color-converted by the second color processing section 31, directly to the D/A converter 32 and simultaneously input it to the memory 35.

Next, the first image taking mode will be described. The first synchronous signal generator 7 is a synchronous signal generator for high-resolution image taking. In accordance with the synchronous signal generated by the first synchronous signal generator 7, the timing generator 12 generates driving pulses for the image taking sensor 10. Then, as in the second image taking mode, the image signal taken by the image taking sensor 10 is subjected to sample-and-hold and AGC (automatic gain control) for removing switching noise and extracting the signal component at the SH,AGC circuit 13, and converted to digital data by the 10-bit A/D converter 14. The image signal converted to digital data by the A/D converter 14 passes through the switch 15, and is color-converted to luminance two-color difference (YUV) data by the first color processing section 17. This luminance two-color difference (YUV) data is stored in the first memory 18 under the control of the first memory controller 19. The luminance two-color difference (YUV) data, which is stored in the first memory 18, is compressed by the compressor/expander 20 as needed, and transmitted to an external file or a computer (not shown) through the interface 21.

It is also possible for the image signal converted to digital data by the A/D converter 14 to be transmitted to an external file or a computer (not shown) through the interface 21.

Due to the above construction, it is possible to output image signals in accordance with a standard video system through selection of the second image taking mode. Further, by selecting the first image taking mode, it is possible to output a high-resolution image signal. In whichever mode, the image signals are stored in the memory.

(Second Embodiment)

Figure 3:
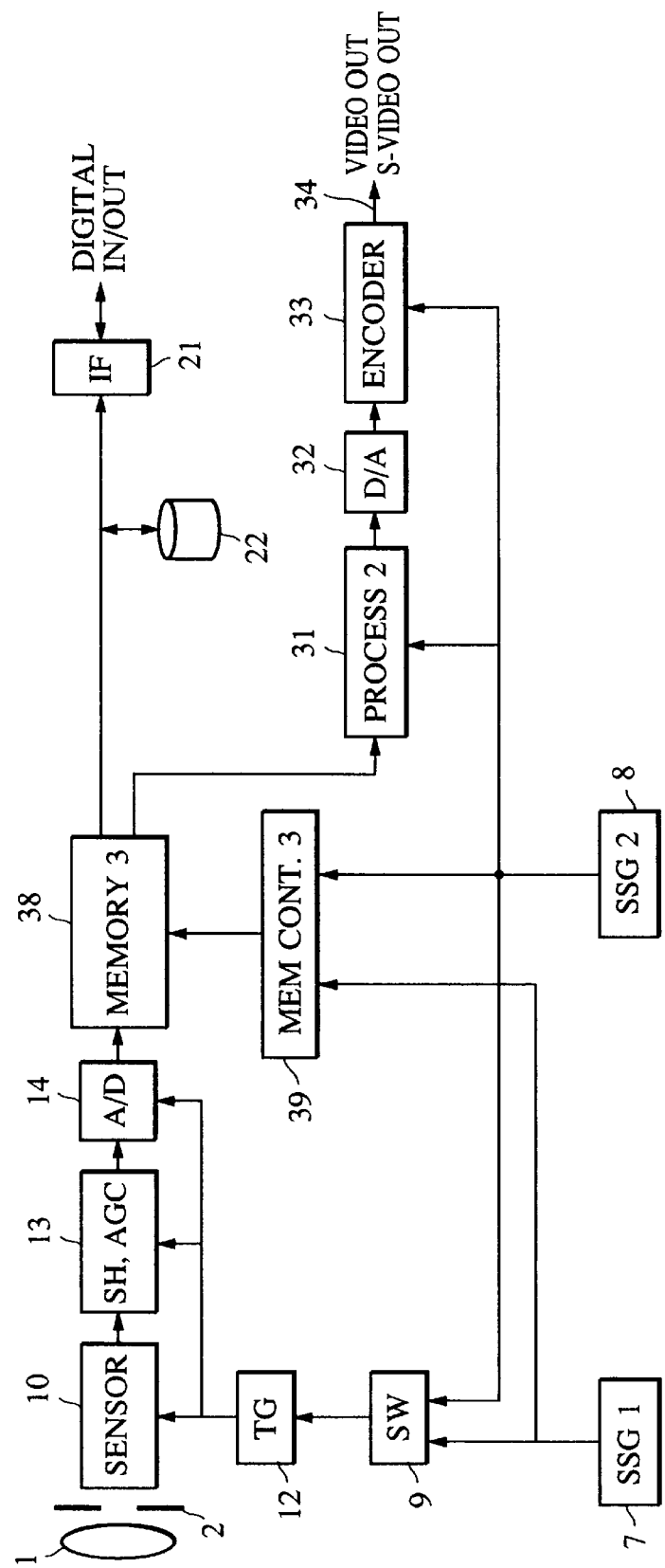
FIG. 3 is a block diagram showing a second embodiment of the present invention.

FIG. 3 is a block diagram showing the second embodiment of the present invention. The components which are the same as or equivalent to those of the first embodiment are indicated by the same reference numerals and a description of such components will be omitted.

In FIG. 3, numeral 38 indicates a third memory for storing the output of the image taking sensor 10 as it is, and numeral 39 indicates a third memory controller for controlling the third memory 38.

As in the first embodiment, the synchronous signal generated by the first or second synchronous signal generator 7 or 8 is switched by the switch 9 to drive the image taking sensor 10. The image signal taken by the image taking sensor 10 is subjected to sample-and-hold and AGC (automatic gain control) for removing switching noise and extracting the signal component at the SH,AGC circuit 13, and converted to digital data by the 10-bit A/D converter 14 to be stored in a third memory 38. Here, the third memory 38 has a capacity that is large enough to store both high-resolution image data (1536×988 pixels) read by the image taking sensor 10 in accordance with the first synchronous signal generator 7 and low-resolution image data (768×494 pixels) read by the image taking sensor 10 in accordance with the second synchronous signal generator 8.

In the second image taking mode, the second synchronous signal generator 8 is selected by the switch 9. When the image taking sensor 10 is taking images in accordance with the second synchronous signal generator 8, the A/D-converted image data is stored in the third memory 38, and, at the same time, transmitted to the second color processing section 31. Then, as in the first embodiment, it is color-converted to luminance two-color difference (YUV) data by the second color processing section 31, and the luminance two-color difference (YUV) data obtained by color conversion is converted to an analog signal by the D/A converter 32, and modulated into a video signal by the encoder 33 before it is output as the video signal 34 and displayed on a video monitor (not shown) or the like.

Next, to be described will be the operation to be performed when the first image taking mode for high-resolution image taking is selected and the switch 9 selects the first synchronous signal generator 7.

When the first synchronous signal generator 7 is selected, the image data, which has been read by the image taking sensor 10 in accordance with the second synchronous signal generator 8 and stored in the third memory 38, ceases to be treated in this way. The images that have been stored before the switching are read in accordance with the second synchronous signal generator 8. The image sensor 10 is then driven in accordance with the first synchronous signal generator 7. The image signals taken by the image taking sensor 10 are subjected to sample-and-hold and AGC (automatic gain control) for removing switching noise and extracting the signal components at the SH,AGC circuit 13, and converted to digital data by the 10-bit A/D converter 14 before it is stored in the third memory 38. The storage area used when storing the data in the third memory 38 is different from the area used in the second image taking mode so that the image data that has been stored prior to the mode switching may not be zapped.

When the image taking at high resolution has been completed, the high-resolution image data stored in the third memory 38 is stored in the storage device file 22, or transmitted to a computer (not shown) through the interface 21 to undergo color processing. At the same time, the image taking mode is restored to the second image taking mode, and the switch 9 is switched to the side of the second synchronous signal generator 8. The image taking sensor 10 is operated in accordance with the second synchronous signal generator 8, and the video signal 34 is output while storing the data in the third memory 38.

As described above, the second embodiment has a construction which is simplified as compared to that of the first embodiment, and it is possible to output video signals and high-resolution digital signals. It is also possible to signals of both types.

(Third Embodiment)

Figure 4:
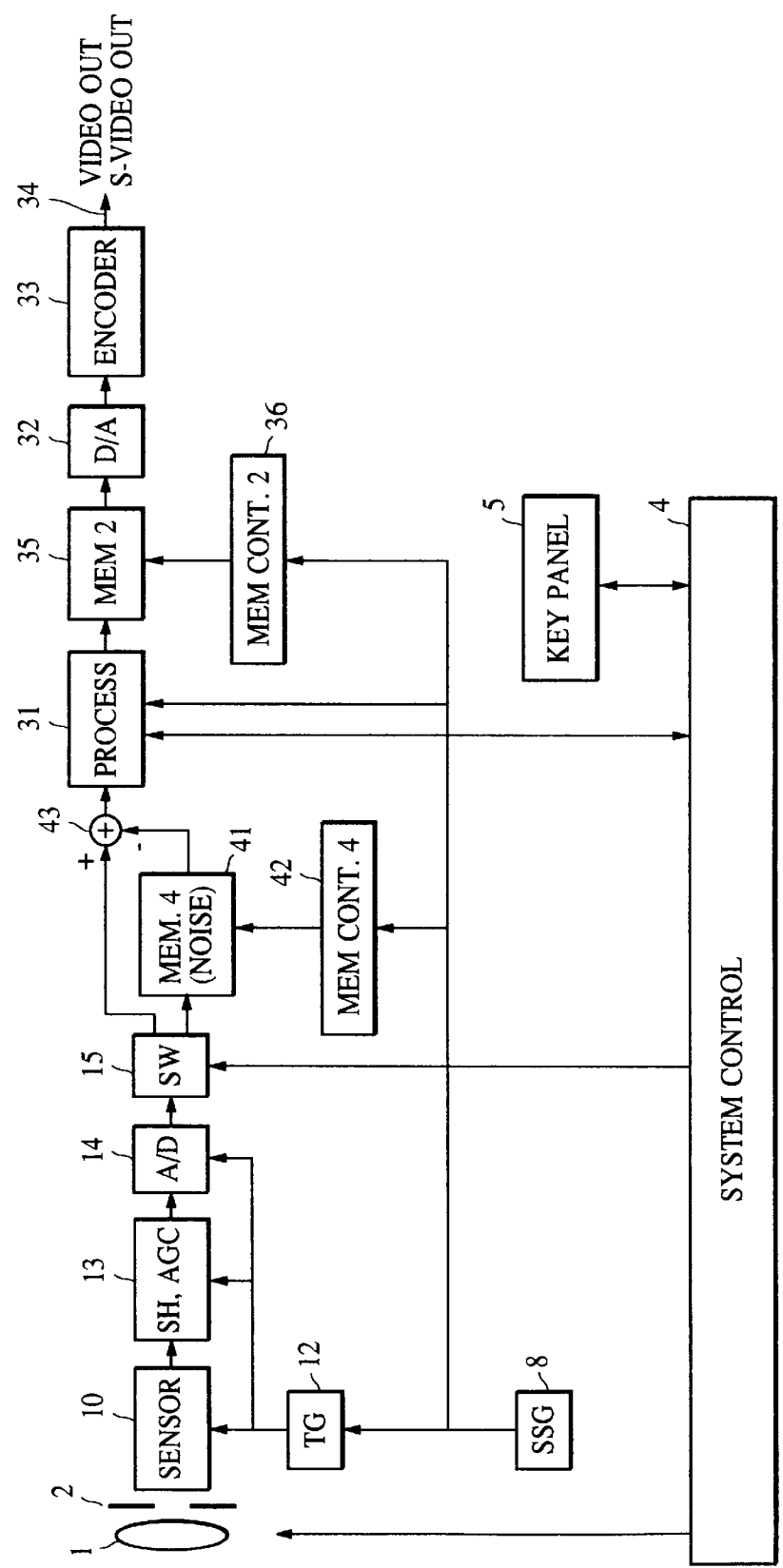
FIG. 4 is a block diagram showing a third embodiment of the present invention.

FIG. 4 is a block diagram showing the third embodiment of the present invention. The components which are the same as or equivalent to those of the above-described embodiments are indicated by the same reference numerals.

In FIG. 4, numeral 1 indicates a lens; numeral 2 indicates an aperture; numeral 4 indicates a system controller for overall control; numeral 5 indicates an operating panel; numeral 10 indicates an image taking sensor; numeral 8 indicates a synchronous signal generator; numeral 12 indicates a timing generator for generating timing pulses for operating the image taking sensor 10; numeral 13 indicates an SH,AGC circuit for performing sample-and-hold on the output of the image taking sensor 12 to thereby effect AGC (automatic gain control); numeral 14 indicates an A/D converter; numeral 15 indicates a switch for switching the output of the A/D converter 14; numeral 41 indicates a fourth memory for storing noise components (noise memory); numeral 42 indicates a fourth memory controller for controlling the fourth memory (noise memory); numeral 43 indicates a computing unit to which image signals are input from the image taking sensor 10 and which subtracts therefrom the noise components stored in the fourth memory (noise memory) 41 before outputting them; numeral 31 indicates a second color processing section for performing color processing; numeral 32 indicates a D/A converter; numeral 33 indicates a video signal encoder; numeral 34 indicates a video output signal; numeral 35 indicates a second memory for storing video data; and numeral 36 indicates a second memory controller for controlling the second memory 35 for video.

In FIG. 4, the image taking sensor 10 operates in accordance with the synchronous signal generated by the sole video synchronous signal generator 8. As in the first embodiment, the image signal output from the image taking sensor 10 is subjected to sample-and-hold and AGC (automatic gain control) for removing switching noise and extracting the signal component at the SH,AGC circuit 13, and converted to digital data by the 10-bit A/D converter 14.

The image signal converted to digital data by the A/D converter 14 is directed to either the fourth memory 41 or the computing unit 43 by the switch (demultiplexer). Here, in a dark noise extraction mode, in which the aperture 2 is closed, the noise components from the image taking sensor 10 are stored in the fourth memory 41 as signals. When image taking is conducted in the normal mode, the image signal is input to the computing unit 43, and the difference between this input data and the noise data stored in the fourth memory 41 is output.

The image signal on which noise component correction has been effected, is subjected to color conversion in the color processing section 31, and converted into luminance two-color difference (YUV) data by the color processing section 31. In this color processing section 31, data for auto white balancing is extracted, and subjected to computation by the system controller 4 to perform gain setting for each color, thereby setting white balance. Similarly, data for automatic focusing and data for auto iris are extracted and subjected to computation by the system controller 4 to thereby adjust the lens and the aperture.

The image signal converted to luminance two-color difference (YUV) data by the color processing section 31 is converted to an analog signal by the D/A converter 32, and the color difference signal is modulated into a chromatic signal indicative of saturation by the encoder 33. Here, the image signal converted to a luminance two-color difference (YUV) signal by the color processing section 31 is displayed as a video signal, and, at the same time, stored in the second memory 35.

In a dark noise extraction mode, in which the aperture 2 is closed, video data taken in the normal image taking mode and stored in the second memory 35 is read and transmitted to the D/A converter 32 before it is output as a video signal.

As described above, this embodiment makes it possible to effectively output video signals. When applied to the video signal output section of the first and second embodiments, this embodiment enables the present invention to be carried out more effectively.

In accordance with the above-described embodiments, it is possible to take images in a high resolution mode and in a normal mode by an image taking device having a number of pixels which is large enough to enable image taking to be performed at high resolution. In both modes, the image signals obtained by processing the output from the image taking device are stored in the storage means.

In the high resolution mode, a digital image signal having high resolution is output. In the normal mode, a video image signal processed according to a predetermined image signal system is output by the image signal output means.

As described above, it is possible to select either the high resolution mode or the normal mode in performing image taking and to output an image signal for image display in accordance with the selected mode. Further, in both modes, the images taken are recorded or stored, and, by reading them and subjecting them to the requisite image taking processing, it is possible to check the images on a monitor.

Figure 5:
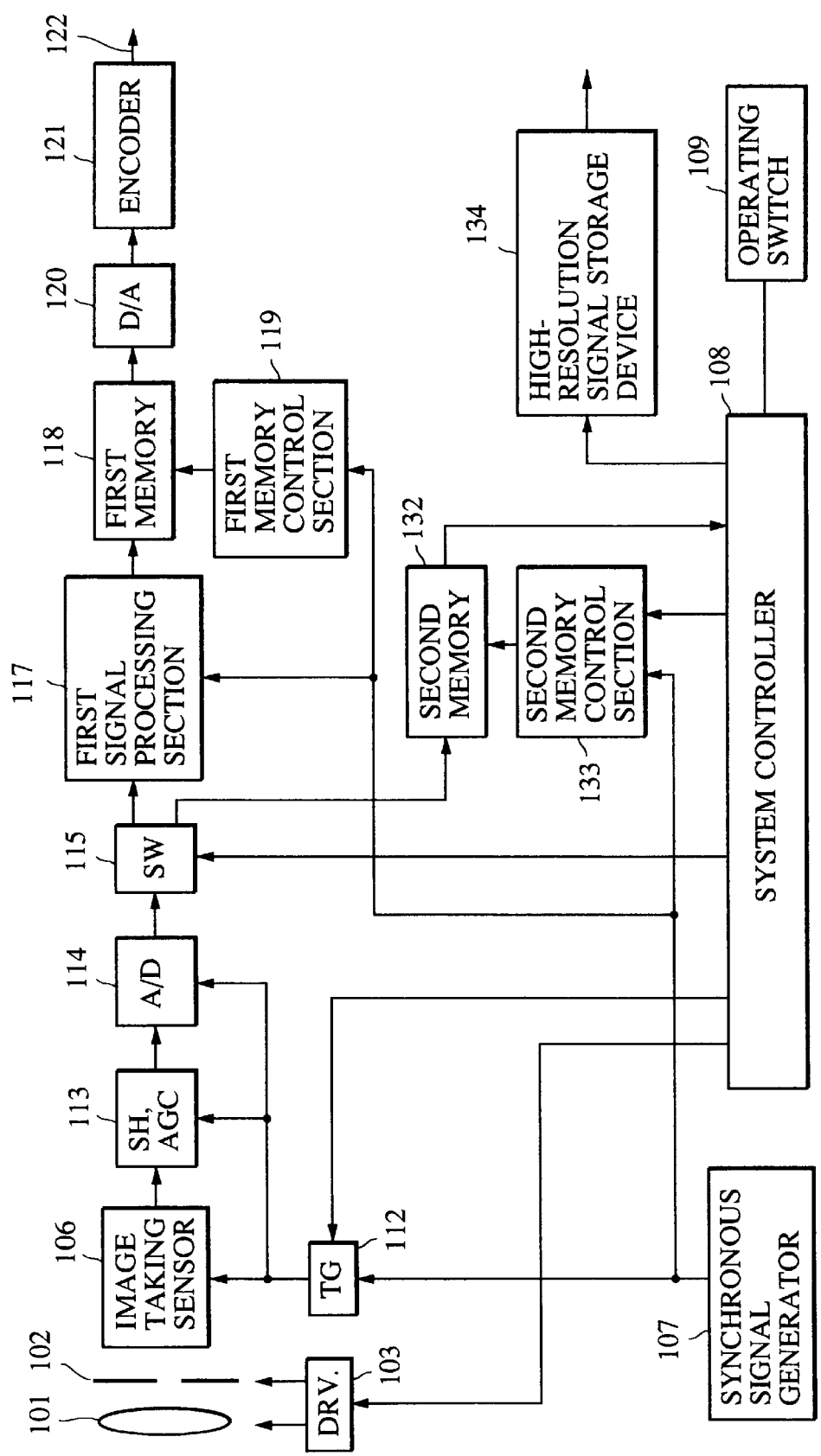
FIG. 5 is a block diagram showing an image taking apparatus according to a fourth embodiment of the present invention.

Thus, in whichever mode the image taking device is operated, it is possible to display the image output on a monitor without any portion thereof being lost. Thus, in an image taking apparatus capable of image taking at high resolution, it is always possible to check images on a monitor. Further, due to the compact and inexpensive additional circuit, the apparatus of this embodiment is superior to the type of apparatus in which the high resolution images are color-processed as they are, in that it makes it possible to check the framing, exposure of taken images, focusing, etc. on the spot FIG. 5 is a block diagram showing an image taking apparatus according to the fourth embodiment of the present invention. In FIG. 5, numeral 101 indicates an optical lens; numeral 102 indicates an aperture; numeral 103 indicates a driver for the optical system; numeral 106 indicates an image taking sensor; numeral 107 indicates a synchronous signal generator (SSG); numeral 108 indicates a system controller for controlling the operation of the entire apparatus; numeral 109 indicates an operating switch; numeral 112 indicates a timing generator (TG); numeral 113 indicates a sample-and-hold/AGC; numeral 114 indicates an A/D converter; numeral 115 indicates a changeover switch (SW); numeral 117 indicates a first signal processing section; numeral 118 indicates a first memory; numeral 119 indicates a first memory control section; numeral 120 indicates a D/A converter; numeral 121 indicates a video encoder; numeral 122 indicates a video signal; numeral 132 indicates a second memory; and numeral 133 indicates a second memory control section.

In FIG. 5, an optical image is formed on the image taking sensor 106 by a light entering through the optical lens 101 and the aperture 102. The image taking sensor 106 may, for example, be an area sensor having a color filter, a CCD sensor, or a MOS type sensor. It is also possible to use a bipolar image sensor (BASIS) having a bipolar transistor for each pixel.

The entire system of the image taking sensor 106 is selectively set to either the first or the second image taking mode through manual operation by using the operating switch 109, and operates in either the first or the second image taking mode through control by the system controller 108. The difference between the first and second image taking modes consists in a difference in the timing signal for driving the image taking sensor 106 and a difference in the subsequent processing system.

First, the operation in the first image taking mode will be described. In the first image taking mode, the image taking sensor 106 is driven by a first timing signal generated by the timing generator 112 in accordance with the synchronous signal generated by the synchronous signal generator 107. In the first image taking mode, the image taking sensor 106 outputs image data after performing addition of two vertically adjacent pixels in the sensor, and is controlled by driving pulses generated by the timing generator 112.

Generally speaking, the timing pulse generator for driving the image taking sensor 106 generates timing pulses that are specific to the associated image taking sensor, so that an IC adapted to each particular image taking sensor is provided. In the first image taking mode, pixel addition of two vertically adjacent pixels is conducted in the image taking sensor, and correlation double sampling and AGC (automatic gain control) are performed, the resultant data being digitized by the A/D converter 114.

In the first image image taking mode, the image signal thus digitized is transmitted to the first signal processing section 117 by the changeover switch 115. In the second image taking mode, it is transmitted to the second memory 132.

In the first image taking mode, the image signal transmitted through the changeover switch 115 is conveyed to the first signal processing section 117, where it is subjected to signal processing so as to be converted to luminance two-color difference signal (YUV). The first signal processing section 117 normally performs signal processing operations, such as color conversion, white balance, gamma conversion, aperture correction, and low-pass filtering to thereby convert the signals transmitted through the color filter of the image taking sensor 106 and optically stored into ordinary color signals (RGB, YUV and the like).

Generally speaking, to perform a processing operation specific to each image taking sensor 106, a signal processing IC adapted to each particular image taking sensor 106 is provided. The signal converted to a luminance two-color difference is input to the first memory 118.

Normally, the luminance two-color signal is supplied to the D/A converter 120 without being stored in the first memory 118 and is converted to an analog signal by the D/A converter. Then, it is encoded into a video signal by the encoder 121 to be output as an output image signal 122, such as a video signal or an S video signal.

Further, when a switch (not shown) in a still picture taking mode is depressed by using the operating switch 109, the signal converted to a luminance two-color difference signal by the first signal processing section 117 is stored in the first memory 118 controlled by the first memory control section 119, and, while the image taking sensor 6 is operating in the second image taking mode, the image signal stored in the first memory 118 is read and transmitted to the D/A converter 120, and encoded by the encoder 121 before it is output as the video signal or S video signal 122.

Next, the operation in the second image taking mode will be described. In the second image taking mode, the addition of two vertically adjacent pixels is not conducted in the image taking sensor 106, and a storage signal corresponding to the exposure amount of each pixel is independently output. In the second image taking mode, the incident light is transmitted to the image taking sensor 106 by way of the optical lens 101 and the aperture 102, as in the first image taking mode, and an optical image is formed thereon to thereby effect image taking. The image signal taken by the image taking sensor 106 is output in accordance with the timing provided by the timing generator 112.

The timing generator 112 drives the image taking sensor 106 by generating timing pulses which do not cause the addition of two vertically adjacent pixels to be performed in the image taking sensor. As in the first image taking mode, the image signal output from the image taking sensor 106 is subjected to correlation double sampling and AGC by the sample-and-hold/AGC circuit 113, and then digitized by the A/D converter 114. Subsequently, the digitized image signal is supplied to the second memory 132 through the changeover switch 115 and stored therein.

The image data stored in the memory 132 is independent data for each of the pixels of the image taking sensor 106. The independent image data is read by the system controller 8, and subjected to computation to be thereby converted to a color signal, which is stored in a high resolution storage device 134 and output to the exterior as needed. This computation processing also consists in signal processing operations, such as color conversion, white balance, gamma conversion, aperture correction, and low-pass filtering to thereby convert the signals transmitted through the color filter of the image taking sensor 106 and optically stored into ordinary color signals (RGB, YUV and the like).

Further, the signal processing computation conducted here consists in color processing for a so-called image processing and color processing for printing, and can be conducted as a separate processing which has not been optimized in order to be displayed on a monitor as in the case of the first signal processing section 117.

As shown in FIG. 5, in the case of the image taking apparatus of this embodiment, the first signal processing section 117 is arranged on the output side of the A/D converter 114 and the changeover switch 115 and effects digital signal processing. In the present invention, however, the processing in the first signal processing section 117 is not restricted to digital processing. It is also possible to perform analog processing, performing digital processing after effecting A/D conversion at the time of input to the memory.

FIG. 6 is a diagram showing a color filter arrangement in an image taking sensor. Basically, it has the same construction as that of FIG; 2. The color filter is a complementary color mosaic filter comprised of Cy (cyan), Mg (magenta), Ye (yellow) and Gr (green). The color filter arrangement of the complementary color mosaic is such that rows of cyan and yellow and rows of green and magenta are alternately arranged, and that the rows of green and magenta change in order for each line.

In the first image taking mode, the addition of two vertically adjacent pixels is effected in the image taking sensor 106. A first field, which consists of the first two lines as counted from the first line, and a second field, which consists of the first two lines as counted from the second line, are output as follows:

First Field $Cy_{1,1}+Gr_{1,2}$, $Ye_{2,1}+Mg_{2,2}$, $Cy_{3,1}+Gr_{3,2}$, $Ye_{4,1}+Mg_{4,2}$, $\cdots$
$Cy_{1,3}+Mg_{1,4}$, $Ye_{2,3}+Gr_{2,4}$, $Cy_{3,3}+Mg_{3,4}$, $Ye_{4,3}+Gr_{4,4}$, $\cdots$
$Cy_{1,5}+Gr_{1,6}$, $Ye_{2,5}+Mg_{2,6}$, $Cy_{3,5}+Gr_{3,6}$, $Ye_{4,5}+Mg_{4,6}$, $\cdots$
$Cy_{1,7}+Mg_{1,8}$, $Ye_{2,7}+Gr_{2,8}$, $Cy_{3,7}+Mg_{3,8}$, $Ye_{4,7}+Gr_{4,8}$, $\cdots$ Second Field $Gr_{1,2}+Cy_{1,3}$, $Mg_{2,2}+Ye_{2,3}$, $Gr_{3,2}+Cy_{3,3}$, $Mg_{4,2}+Ye_{4,3}$, $\cdots$
$Mg_{1,4}+Cy_{1,5}$, $Gr_{2,4}+Ye_{2,5}$, $Mg_{3,4}+Cy_{3,5}$, $Gr_{4,4}+Ye_{4,5}$, $\cdots$
$Gr_{1,6}+Cy_{1,7}$, $Mg_{2,6}+Ye_{2,7}$, $Gr_{3,6}+Cy_{3,7}$, $Mg_{4,6}+Ye_{4,7}$, $\cdots$
$Mg_{1,8}+Cy_{1,9}$, $Gr_{2,8}+Ye_{2,9}$, $Mg_{3,8}+Cy_{3,9}$, $Gr_{4,8}+Ye_{4,9}$, $\cdots$ As stated above, in the second image taking mode, the image taking apparatus of this embodiment does not perform the addition of two vertically adjacent pixels in the image taking sensor 106 is not conducted, and the optically stored signal of each pixel is output as it is. The total data is output line by line through interlace output in the period of two fields, or separately in upper and lower halves.

Figure 7:
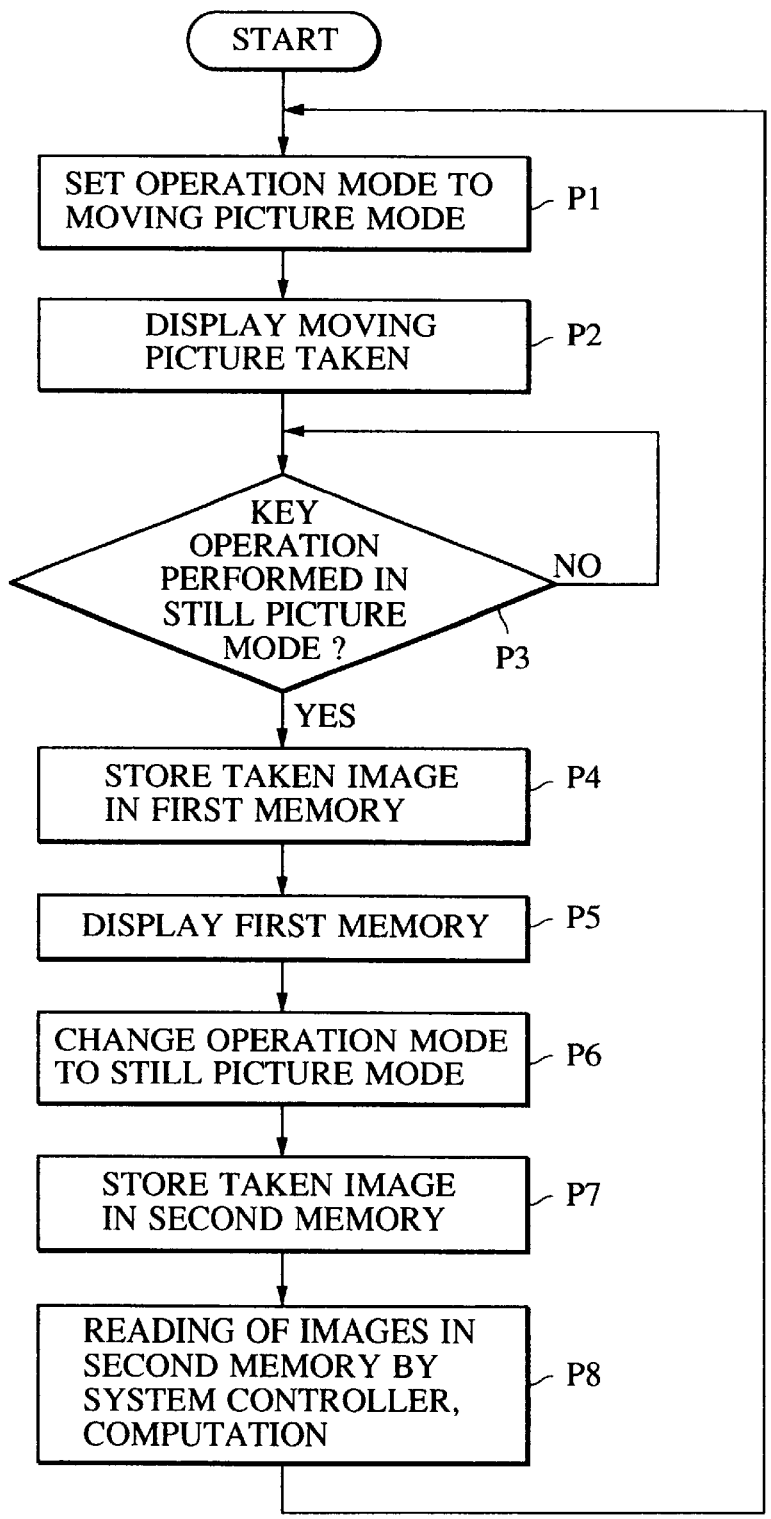
FIG. 7 is a flowchart illustrating the operation of the fourth embodiment.

FIG. 7 is a flowchart illustrating the operation of the image taking apparatus of FIG. 5. As shown in FIG. 7, first, in step P1, the image taking mode is set to the first image taking mode, which is a moving picture taking mode, by the system controller 108, and the image taking sensor 106 is operated in this image taking mode.

Then, the image signal taken is subjected to signal processing by the signal processing means 117, and supplied to the D/A converter 120 without being stored in the first memory 118. Subsequently, in step P2, the image signal converted to an analog signal is encoded by the encoder 121, and output as a video signal, thereby displaying the moving picture taken.

Next, in step P3, a judgment is made as to whether the operating switch 109 has been manipulated or not, and the moving picture taking mode is maintained until the operation in a still picture taking mode is performed by the operating switch 109. When the operating switch of the second image taking mode, which is the still picture taking mode, is depressed, the image being taken in the moving picture taking mode is stored in the first memory 118 (step P4), and, at the same time, read and displayed (step P5).

As a result of the above operation, in the next step P6, the display is changed from the moving image which has been taken by the image taking sensor 106 to the still image stored in the first memory 118. After this, the image taking mode is switched to the still picture taking mode, that is, the second image taking mode.

In the second image taking mode, the image taking sensor 106 operates in the still picture taking mode, and the changeover switch 115 is switched to the side where the input image signal is transmitted to the second memory 132. The image signal taken by the image taking sensor 106 in this still picture taking mode is stored in the second memory 132 as independent data on each pixel (step P7).

Then, the image data stored in the second memory 132 is read by the system controller 8 and subjected to computation processing to be thereby converted to luminance two-color difference data or RGB data (step P8). Here, the signal processing computation is advantageous when separately performing color processing for a so-called image processing, or color processing for printing, that is, a processing that is not a signal processing optimized for the purpose of monitor display as in the case of first signal processing section 117, for example, a processing for realizing an enhanced resolution.

In this embodiment, the second signal processing section is formed by a software based on the system controller 108 to perform a processing as mentioned above. However, it is also possible to realize the above signal processing section in the form of a hardware.

Figure 8:
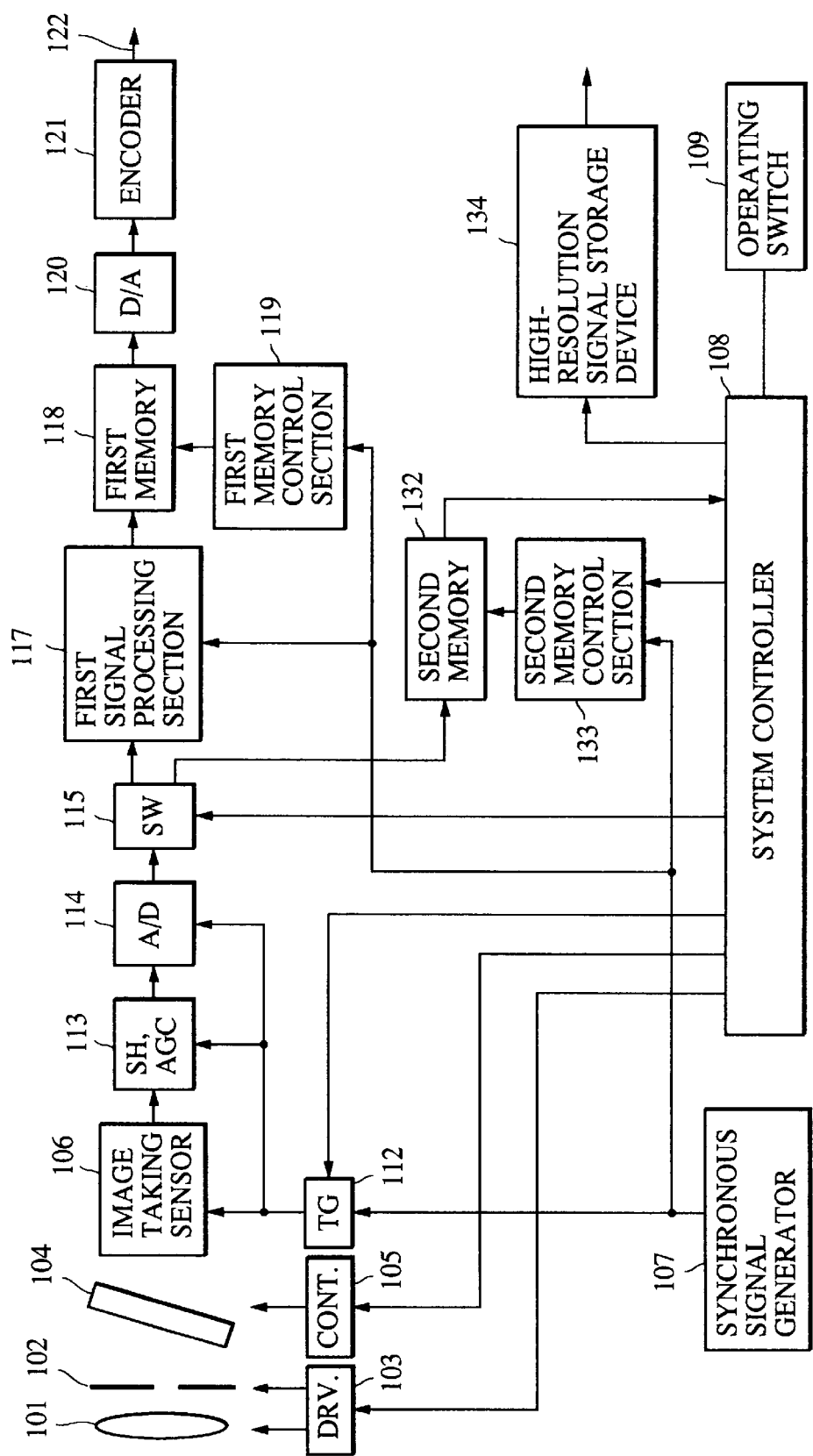
FIG. 8 is a block diagram showing an image taking apparatus according to a fifth embodiment of the present invention.

FIG. 8 shows the fifth embodiment of the present invention. In FIG. 8, numeral 104 indicates a rotatable plane parallel plate for moving the optical axis; and numeral 105 indicates control means for controlling the rotatable plane parallel plate 104. Apart from the above, the image taking apparatus of this embodiment has the same construction as that shown in FIG. 5.

In the image taking apparatus of FIG. 8, the rotatable plane parallel plate 104 is arranged between the group consisting of lens 101 and the aperture 102 and the image taking sensor 106. This rotatable plane parallel plate 104 is rotated around two axes perpendicular to the optical axis. This makes it possible to move the optical image formed on the image taking sensor 106. By controlling the angle of rotation of the rotatable plane parallel plate 104 by the control means 105, it is possible to move the optical image formed on the image taking sensor 106 by a desired movement amount.

Figure 9:
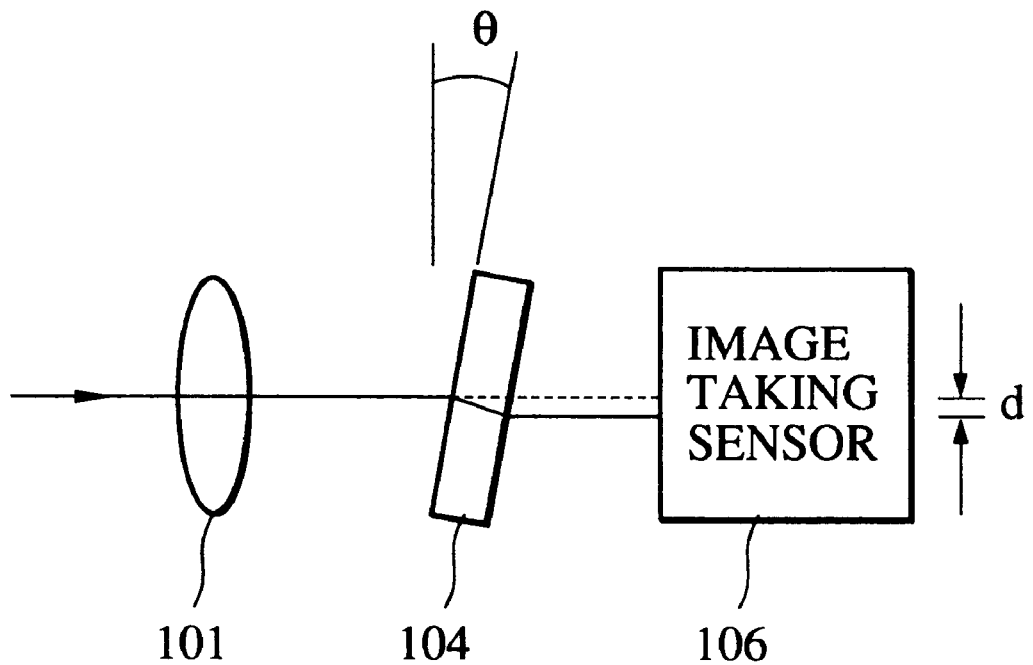
FIG. 9 illustrates a optical axis movement by a plane-parallel plate.

FIG. 9 is a diagram showing that an optical image is moved by rotating the plane parallel plate around an axis parallel to the optical axis. Symbol θ indicates the angle of rotation of the plane parallel plate 104, and symbol d indicates the movement amount of the optical image. The movement amount d of the optical image is a function of the refractive index n, thickness T, and angle of rotation θ of the plane parallel plate 104.

When a particular plane parallel plate 104 is selected, the refractive index n and the thickness T are uniquely determined. Thus, the movement amount d of the optical image is a function of the angle of rotation θ only, as expressed by the following equation:

$$d = (\theta, n, T) \quad (1)$$

$$d = T\sin\theta \left(1 - \frac{\cos\theta}{\sqrt{(n^2 - \sin^2\theta)}}\right) \quad (2)$$

When the value of θ is small, the following approximation holds true:

$$d \text{ is} = T\left(1 - \frac{1}{n}\right)\sin\theta \quad (3)$$

In expression (3), when the value of θ is small, linear approximation of sin θ is substantially possible, whereby the amount of movement d of the optical image can be easily obtained from the angle of rotation θ of the plane parallel plate 104.

$$\theta = \sin^{-1}\left\{T\left(1 - \frac{1}{n}\right)\right\} \quad (4)$$

In FIG. 8, the operation in the first image taking mode is the same as that in the first embodiment. In the second image taking mode, the image taking sensor 106 performs no pixel addition, but the optical storage data of each pixel is output. Further, the storage in the second memory 132 is repeated a plurality of times while controlling the plane parallel plate 104 by the control means 105.

By the above operation, image signals are taken in while effecting pixel shift, and the image signals thus taken in are subjected to computation processing, such as color processing, whereby a high-resolution image can be obtained. Actually, the movement of the plane parallel plate 104 is controlled such that the optical image on the plane parallel plate 104 moves one pixel to the left, one pixel downwards, and one pixel to the right, the image signal obtained by image taking in each position being stored in the second memory 132.

In this way, the optical image is moved one pixel at one time, and stored in the memory at each position, whereby filter data of the four colors (Cy, Ye, Mg and Gr) is stored in the second memory 132. Due to this arrangement, four-color data exists in each pixel, so that computation processing is possible for each pixel, thereby making it possible to enhance the resolution as compared with that of a single-plate color sensor.

Next, an image taking example when the pixel shift is effected while moving the plane parallel plate 104 will be described with reference to FIG. 10. FIG. 10(a) shows an image taking using a complementary color mosaic filter. First, image data taken in this condition is stored in the second memory 132. FIG. 10(b) shows the condition in which the plane parallel plate 104 is rotated from the position of FIG. 10(a) so as to shift the image one pixel to the left. The broken line indicates the range of the moved optical image.

FIG. 10(c) shows the condition in which the plane parallel plate 104 is rotated from the position of FIG. 10(b) so as to shift the image one pixel upwards. FIG. 10(d) shows the condition in which the plane parallel plate 104 is rotated from the position of FIG. 10(c) so as to shift the image one pixel to the right. Through these four positions, it is possible to store four kinds of image data obtained by moving the optical image upwards, downwards, to the right and to the left, one pixel at one time.

Figure 11:
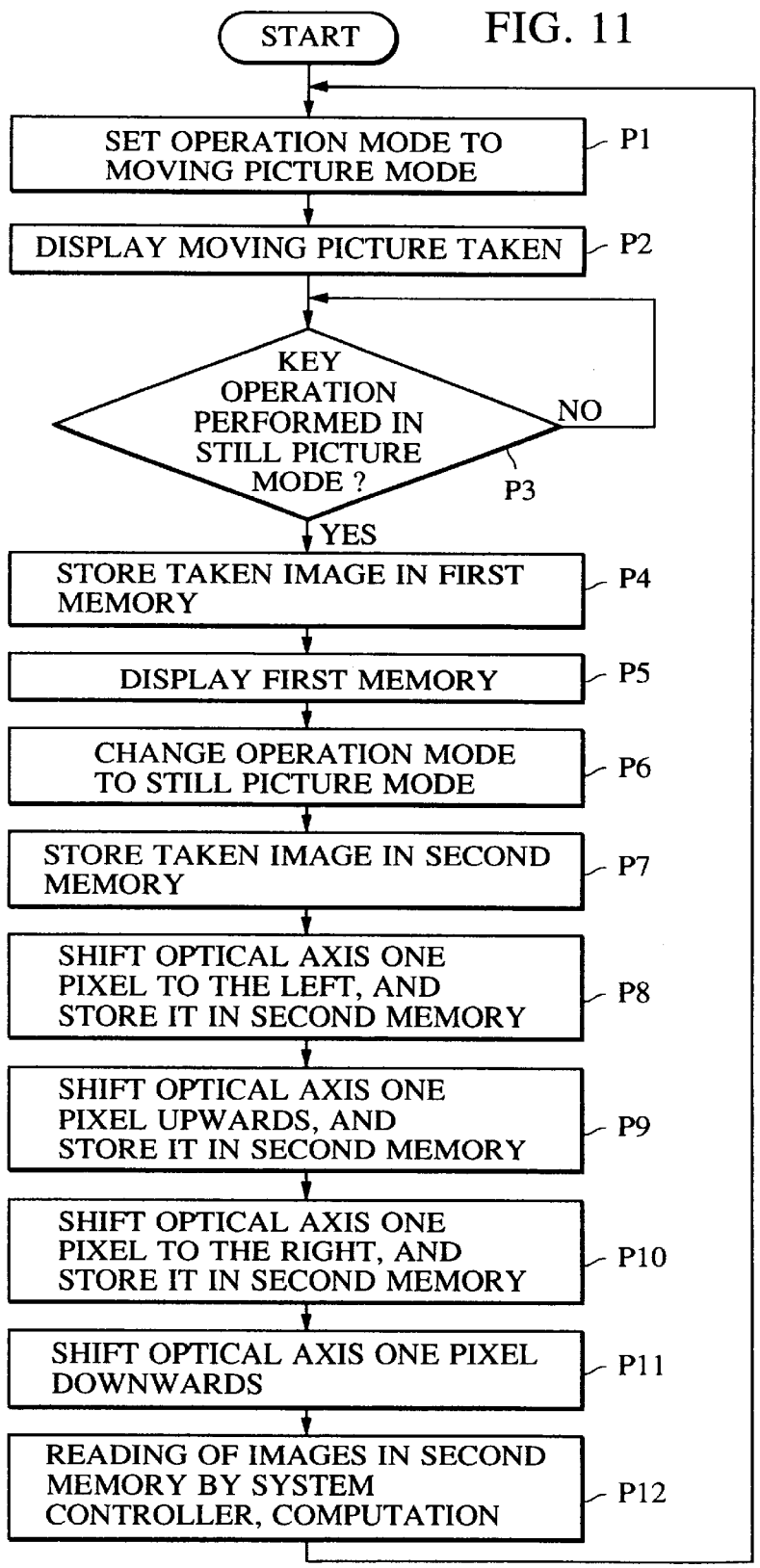
FIG. 11 is a flowchart illustrating the operation of the fifth embodiment.

FIG. 11 is a flowchart for illustrating the operation of an image taking apparatus according to the fifth embodiment.

In FIG. 11, first, in step P1, the operation mode is set to the moving picture taking mode (that is, the first image taking mode), and the image taking sensor 106 is operated in this image taking mode.

The image signal taken is then subjected to signal processing by the first signal processing means 117, and supplied to the D/A converter 120, without being stored in he first memory 118, thereby converting the image signal to an analog signal. The image signal thus converted to an analog signal is then supplied to the encoder 121 and encoded before it is displayed as a video signal (step P2).

Next, the procedure advances to step P3, where a judgment is made as to the still picture mode has been set through key operation or not, and this image taking mode is maintained until the operation mode is set to the still picture taking mode by using the operating switch 109.

When the still picture taking mode (the second image taking mode) switch is depressed, the image which has been taken in the moving picture taking mode is stored in the first memory 118 (step P4), which is read out for display (step P5). Next, in step P6, the display is switched from the image taken by the image taking sensor 106 to the image stored in the first memory 118, and then the moving picture taking mode is switched to the still picture taking mode (that is, the second image taking mode).

In the still picture taking mode, the image taking sensor 106 operates in the still picture taking mode, and the changeover switch 115 is switched to the position in which the image signal is transmitted to the second memory 132. The image signal taken by the image taking sensor 106 in the still picture taking mode is stored in the second memory 132 as independent data on each pixel (step P7).

Subsequently, the procedure advances to step P8, in which the plane parallel plate 104 is rotated under the control of the control means 105 so as to shift the optical image formed on the image taking sensor 106 one pixel to the left to attain the condition of FIG. 10(b), which is stored in the second memory 132.

Similarly, in the next step, P9, the optical image is shifted one pixel upwards to attain the condition of FIG. 10(c), which is stored in the second memory 132. Similarly, the optical image is shifted one pixel to the right to attain the condition of FIG. 10(d), which is stored in the second memory 132 (step P10). Finally, the optical image is shifted one pixel downwards to restore the optical image to the original position (step P11).

In this way, the plane parallel plate 104 is used to take in image data four times, while shifting the image one pixel at one time. By using the image data thus taken in four times, the system controller 108 reads the data and performs computation processing to convert the data to luminance two-color difference data or RGB data.

Unlike the signal processing conducted when forming a color image with a single plate sensor, the signal processing computation conducted here enables a color image signal to be formed through a simple matrix computation since every pixel is provided with four color (Cy, Mg, Ye and Gr) data. Thus, it is possible to form an image signal of a higher resolution as compared to the image signal obtained by the single place sensor.

While in this example the second signal processing section is formed by a software based on the system controller 108, it is also possible for the second signal processing section to be realized in the form of a hardware.

Further, while in the fifth embodiment the pixel shift is conducted by using the plane parallel plate 104, a similar pixel shift is also possible by lens shift (in which one or a plurality of lenses of a plurality of lenses are shifted perpendicularly with respect to the optical axis), or by using a variable-apex-angle prism.

Further, while in the fifth embodiment one-pixel shift is effected four times to thereby enhance resolution, it is also possible to attain a further enhancement of resolution by effecting ½ pixel shift four times both vertically and horizontally, i.e., sixteen times in total.

Figure 12:
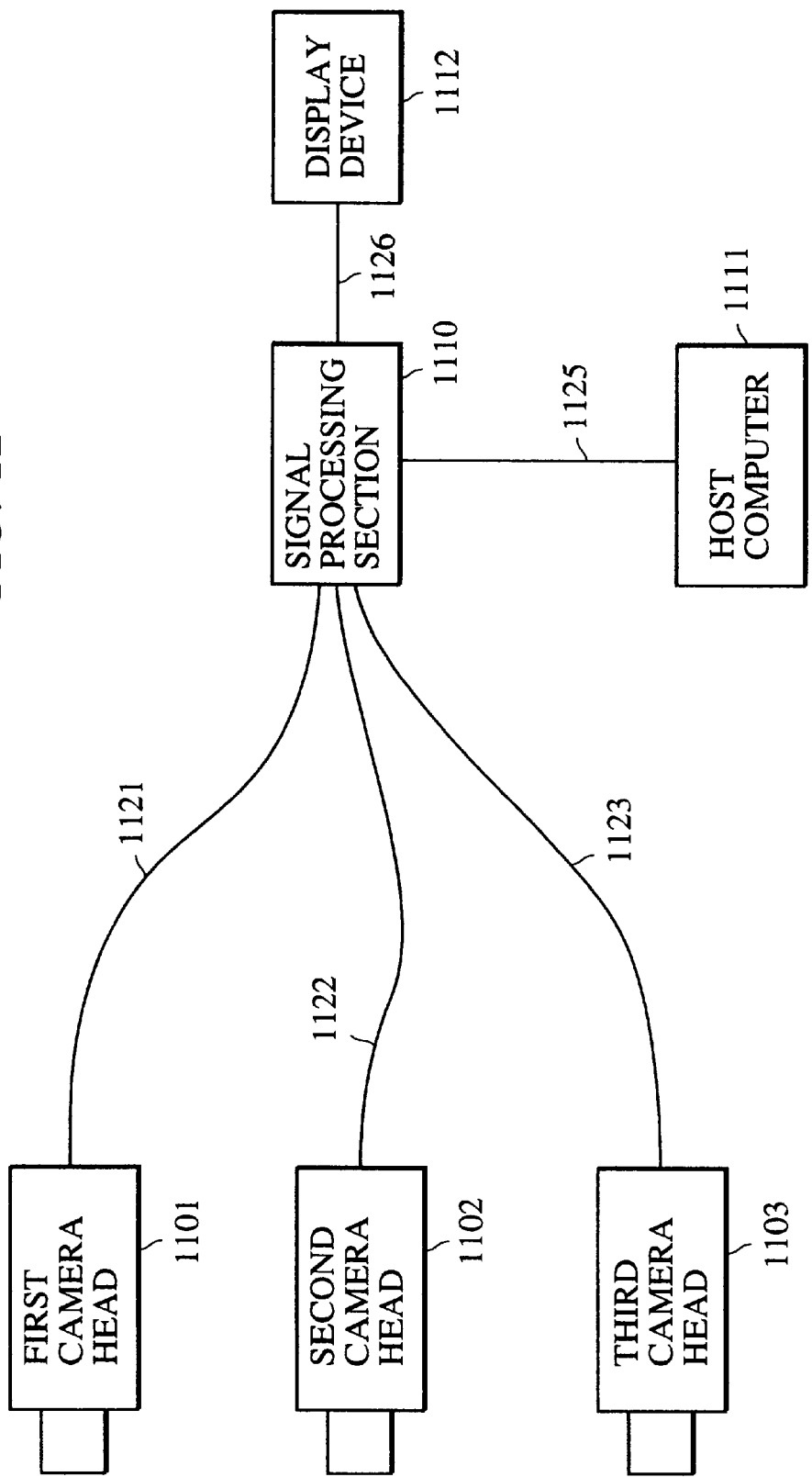
FIG. 12 is a block diagram showing an image taking apparatus according to a sixth embodiment of the present invention.

Next, an image taking apparatus according to a sixth embodiment of the present invention will be described. FIG. 12 is a schematic diagram showing an image taking apparatus according the sixth embodiment. According to the sixth embodiment, the image taking apparatus is divided into a camera head section and a camera signal processing section, thereby making it possible to selectively connect a plurality of camera head sections.

In FIG. 12, numeral 1101 indicates a first camera head section; numeral 1102 indicates a second camera head section; and numeral 1103 indicates a third camera head section. Numeral 1110 indicates a camera signal processing section; numeral 1111 indicates a host computer; numeral 1112 indicates a monitor for display; numerals 1121, 1122 and 1123 indicate signal cables for connecting the camera head sections to the signal processing section; numeral 1125 indicates a signal cable for connecting the host computer to the camera signal processing section; and numeral 1126 indicates a video cable.

Figure 13:
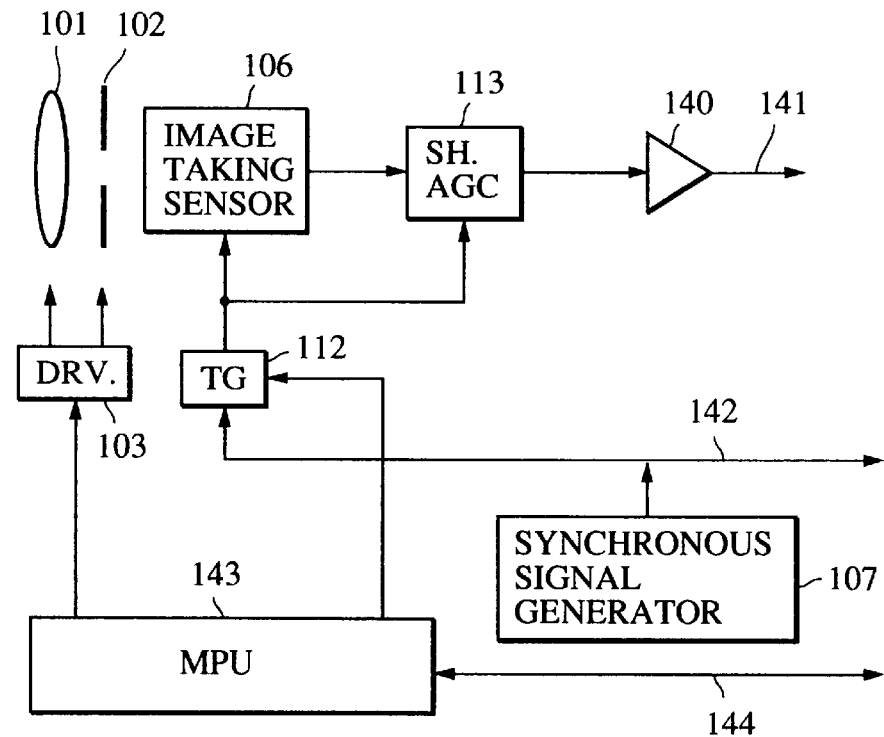
FIG. 13 is a block diagram showing the construction of a first camera head section.
Figure 14:
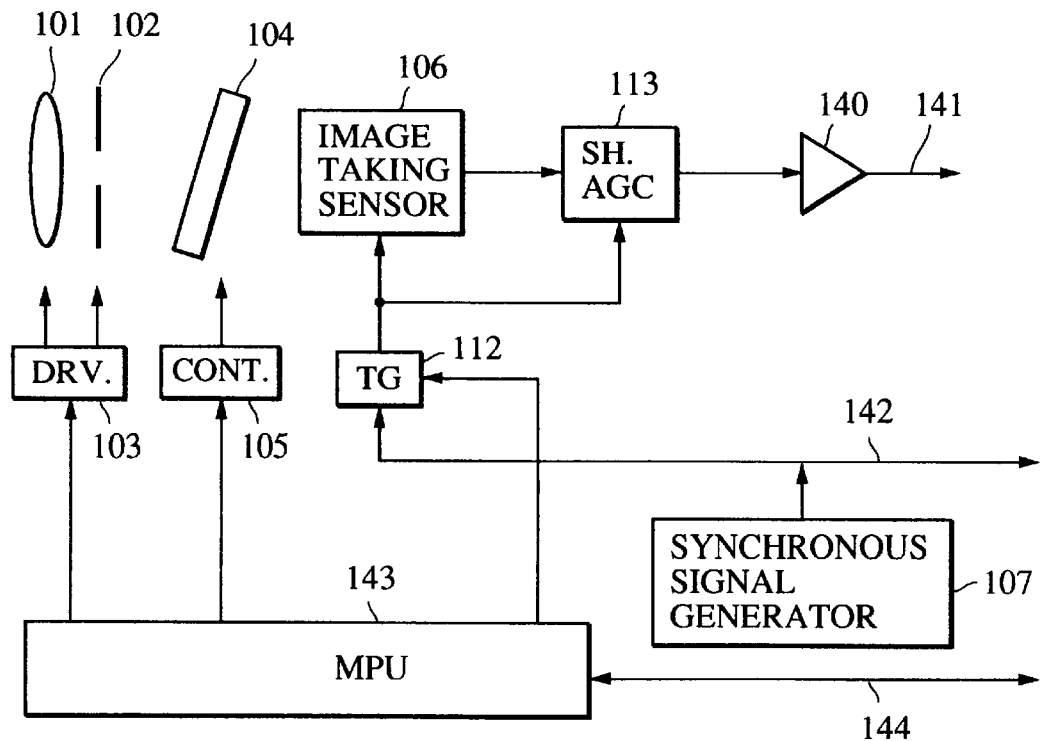
FIG. 14 is a block diagram showing the construction of a second camera head section.
Figure 15:
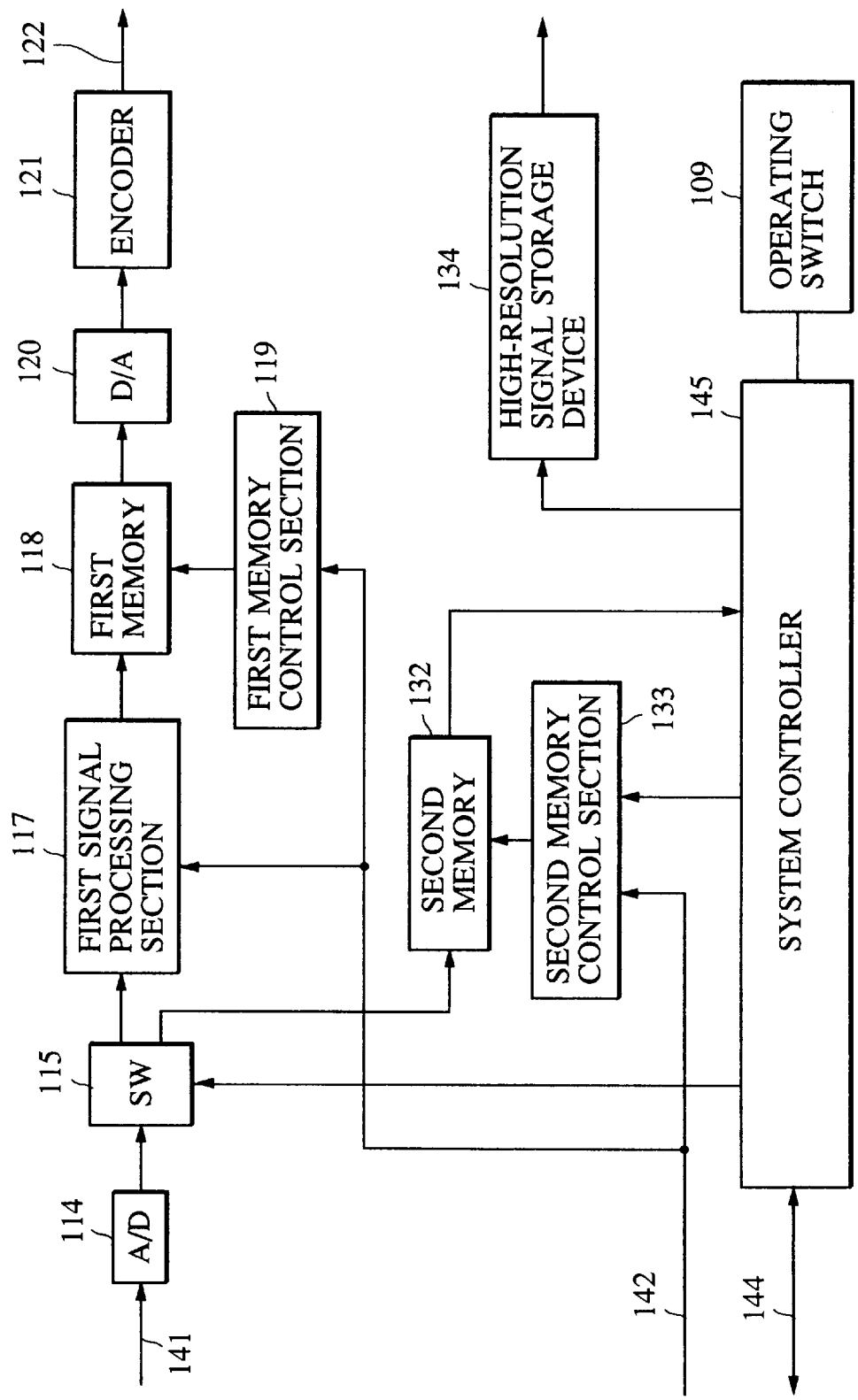
FIG. 15 is a block diagram showing the construction of a camera signal processing section.

FIGS. 13 and 14 are block diagrams showing camera head sections. FIG. 15 is a block diagram of the camera signal processing section. The camera head section of FIG. 13 is a camera head in which no pixel shift is effected, the camera head section of FIG. 14 is a camera head in which pixel shift is effected to thereby attain an enhanced resolution. In FIGS. 13, 14 and 15, numeral 140 indicates an amplifier; numeral 141 indicates an image signal transmission line; numeral 142 indicates a signal line for transmitting a synchronous signal generated by the synchronous signal generator 107; numeral 143 indicates a control unit (MPU) for controlling the operation of the camera head sections; and numeral 144 is a signal line for connecting between the control unit 143 and the camera system controller 145.

In the sixth embodiment, the camera head and the signal processing section are separated from each other, so that it is possible to freely combine a plurality of kinds of camera heads. Thus, through combinations of the camera heads and the signal processing section, it is possible to construct, for example, an image taking system in which only one image taking mode is supported, or an image taking system in which high resolution image taking is possible.

As described above, in accordance with the present invention, a plurality of moving picture taking modes are provided for the image taking sensor, and, at the same time, at least two kinds of signal processing sections are provided in correspondence with the above-mentioned plurality of moving picture taking modes to perform signal processing separately in each of these moving picture taking modes, so that it is possible to satisfactorily conduct the signal processing for monitor display and other image signal processing operations.

Further, an optical axis moving means is provided, by means of which the respective signals of the pixels of the image taking sensor can be independently extracted, thereby making it possible to perform image taking at high resolution.

Further, by separating the camera head and the signal processing section from each other, it is possible to freely combine a plurality of types of camera heads, and, through appropriate combination of these camera heads, it is possible to realize, for example, an image taking system in which only one image taking mode is supported, or an image taking system that is capable of image taking at high resolution.

Further, regarding the optical axis moving means, it can be realized without involving an increase in the size of the optical system in the case of the lens shifting method. In the case of the method using a variable-apex-angle prism, it is possible to move the optical axis to a great degree. In the case of the method in which the plane parallel plate is rotated, it is possible to effect fine changes relatively easily.

Figure 16:
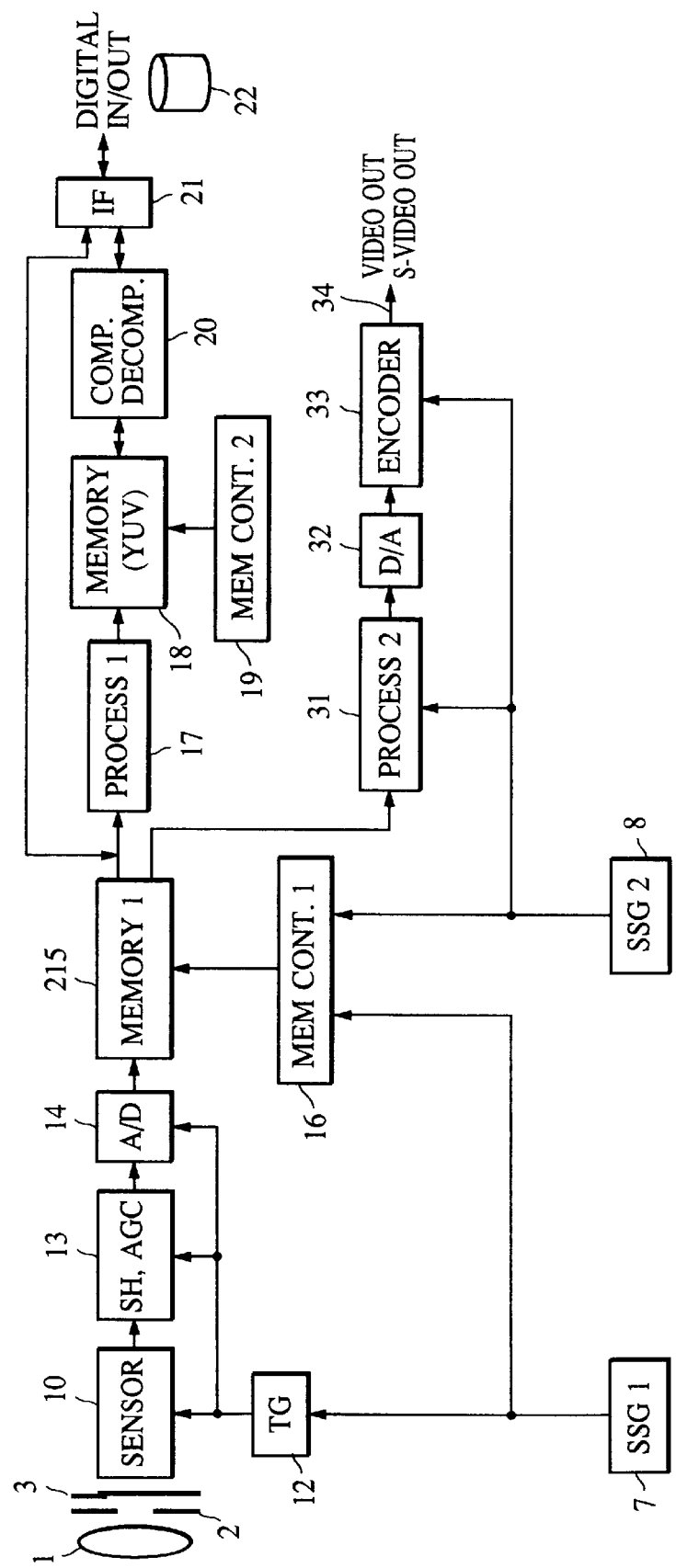
FIG. 16 is a block diagram showing a seventh embodiment of the present invention.

FIG. 16 is a block diagram of the seventh embodiment of the present invention. In the drawing, the components which are the same as those of FIGS. 1 through 15 are indicated by the same reference numerals. Numeral 3 indicates a shutter, and numeral 215 indicates a first memory.

Next, the operation of this embodiment will be described. In FIG. 16, when the shutter 12 is opened, the sensor 10 is exposed, and, in accordance with the synchronous signal generated by the first synchronous signal generator 7, driving pulses for the sensor 10 are generated by the timing generator 12, and the electric charge stored in the sensor 10 is read out. The SH,AGC circuit 13 eliminates switching noise from the high resolution signal read out by the sensor 10. After sample-and-hold and AGC for extracting the signal component, the image signal is converted to digital data by the 10-bit A/D converter 14.

The image data converted to digital data by the A/D converter 14 is stored in a first memory 215 under the control of the first memory controller 16. Here, the image signal read from the sensor 10 is stored as it is in the first memory 215. After this, in the first color processing section 17, color conversion is effected to convert the data to luminance two-color difference (YUV) data, which is stored in the second memory 18 for YUV.

When reading data stored in the first memory 215 and subjecting it to color processing, a color processing circuit for video cannot be used, and it is necessary to conduct color conversion with software or provide a dedicated computation circuit like DSP. Thus, in reality, this stage take a lot of time. The image signal converted to luminance two-color difference (YUV) data is compressed by the compression/expansion section 20 as needed before it is supplied to the file of the storage device 22 through the interface 21. When the data read from the file is compressed data, it is expanded by the compression/expansion section 20.

Next, when previewing the image taken by the sensor 10, the image data stored in the first memory 215 is read under the control of the first memory controller 16 in accordance with the synchronous signal generated by the ordinary synchronous signal generator for television 8, and input to the second color processing section 31. Here, the image of 1536×988 pixels is compressed to ½ and read as an image of 768×494 pixels. By thus reducing the number of pixels to 768×494, the same condition as in the case of a CCD sensor that is widely used in ordinary television sets is obtained.

This ½ reduction can be effected in various ways, such as thinning-out by half, a reduction in information amount by performing averaging with respect to each filter, a reduction by interpolation, or by simply reading exclusively the area corresponding to ½.

Since the input signal of the second color processing section 31 is obtained by reading image data stored in the first memory 15 in synchronization with an ordinary synchronous signal for television, it is possible to use a color conversion circuit widely used in video cameras, etc. for this color processing section. Therefore, the processing in this section can be performed in a short time. The image signal converted to luminance two-color difference (YUV) data by the second color processing section 31 is converted to an analog signal by the D/A converter 32, and modulated into a video signal for an ordinary television system by the encoder 33 before it is output as the video signal 34 and displayed on a video monitor (not shown).

Figure 17:
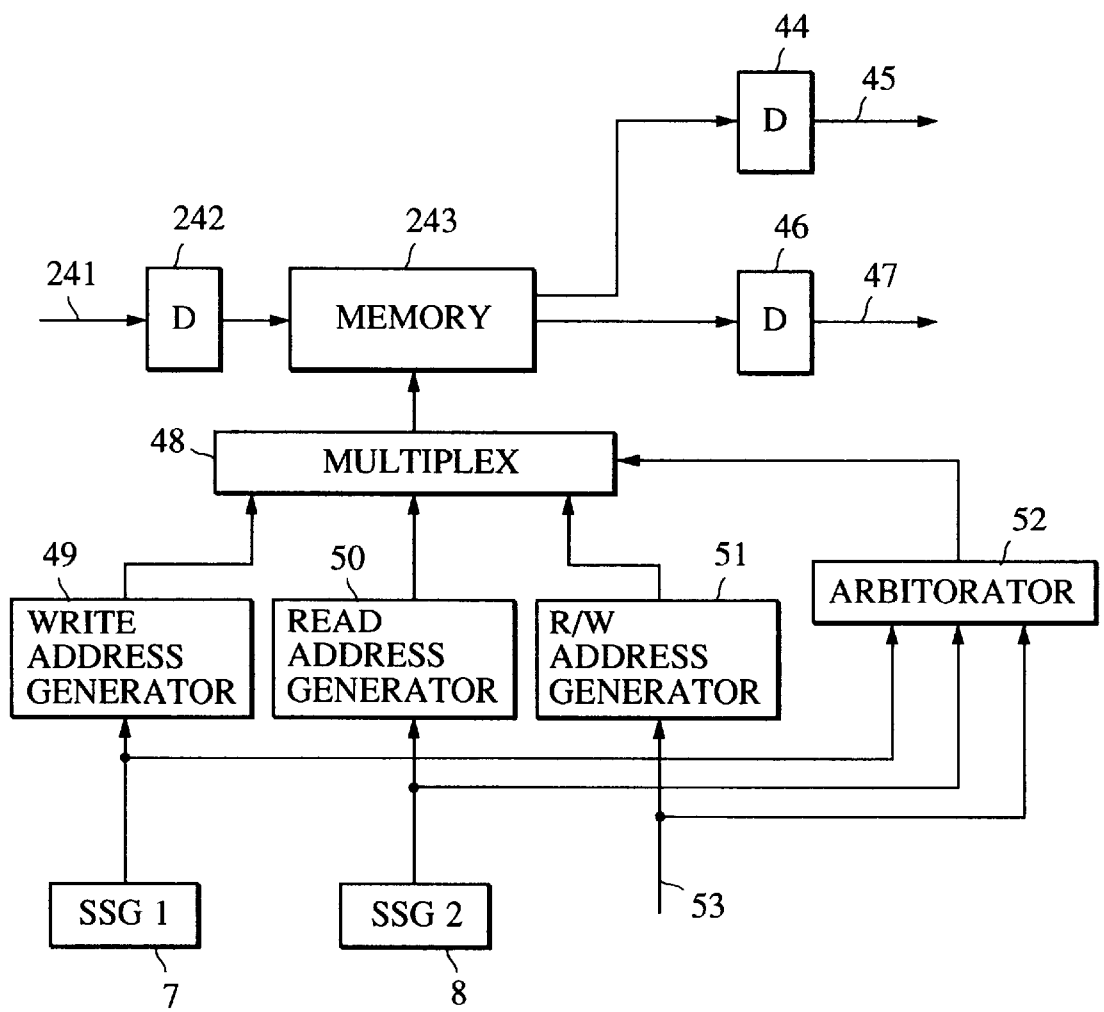
FIG. 17 illustrates the construction of a first memory and that of a first memory controller in detail.

FIG. 17 is a block diagram showing the construction of the first memory 215 and that of the first memory controller 16 in detail.

In FIG. 17, numeral 241 indicates digital image data obtained by conversion at the A/D converter 14; numeral 242 indicates an input buffer to the first memory 215; numeral 243 indicates a memory section of the first memory 215; numeral 44 indicates a first output buffer of the memory section 243; numeral 45 indicates an output signal from the memory section 243 to the first color processing section 17 of FIG. 16; numeral 46 indicates a second output buffer of the memory section 243; and numeral 47 indicates an output signal from the memory 243 to the second color processing section 31.

Numeral 48 indicates an address mulitplexer for the memory section 243; numeral 49 indicates a write address generator for generating an address signal for storing image data in the memory section 243 in accordance with the synchronous signal generated by the first synchronous signal generator 7; and numeral 50 indicates a read address generator for generating an address for reading image data from the memory section 243 in accordance with the synchronous signal generated by the second synchronous signal generator 8.

Numeral 51 indicates a read/write address generator for generating a read/write address for conducting color processing in the first color processing section 17 and reading and writing image data of the memory section 243 through the interface 21; numeral 52 indicates a memory access arbitrator for avoiding conflict in access in the memory section 243; and numeral 53 indicates a request signal for reading/writing image data of the memory section 243 through the interface 21 in order to perform color processing in the first color processing section 17.

Next, the operation of this embodiment will be described. In FIG. 17, the image taken by opening the shutter is A/D-converted in accordance with the synchronous signal generated by the first synchronous signal generator 7, and the image data 241 is input to the memory section 243 through the input buffer 242 of the memory 215. At the same time, a write address for writing into the memory section 243 is generated by the write address generator 49 in accordance with the synchronous signal generated by the first synchronous signal generator 7, and image data transmitted through the input buffer 42 is stored in a predetermined address in the memory section 243.

The image data stored in the memory section 243 is read from the memory section 243 in accordance with the synchronous signal generated by the second synchronous signal generator 8 and in accordance with the address generated by the read address generator 50. In this process, a number of pixels corresponding to ½ in the X and Y-directions of the stored image data are read out.

The thinning-out to ½ can be effected, for example, by a method according to which the two address counters of X and Y are incremented by two at one time, or a method according to which the two address counters of X and Y count in the normal manner, and the data obtained is shifted by 1 bit (doubled) before it is supplied to the memory section 243. In another method for ½ reduction, a reduction can be effected through computation instead of by thinning out. When exclusively an area corresponding to ½ is simply read, a start address for specifying the area to be read out is provided, and the X and Y-address counting is conducted with the start address as offset, thereby making it possible to read a ½ area.

By reading image data stored in the memory section 243 in accordance with the address generated by the read address generator 50, the image data is transferred to the second color processing section 31 through the second output buffer 46, whereby, as described with reference to FIG. 16, the data is output through the second color processing section 31, the D/A converter 32 and the encoder 33 as the video signal 34, thereby making it possible to check the taken image on a video monitor.

When the framing, etc. of the taken image has been checked in this way through the television monitor, the image data stored in the memory 243 is read out in accordance with the address generated by the write/read address generator 51, and subjected to color conversion by the first color processing section 17 through the first output buffer 44. Here, the memory access arbitrator 52 serves to perform arbitration between the three access requests from the first synchronous signal generator 7 during image taking, the second synchronous signal generator 8 for video output, and the request signal 53 for the operation of the first color processing section 17.

The second synchronous signal generator 8 for video output constantly generates an access request to constantly supply data to the video monitor. However, the access request from the first synchronous signal generator 7 during image taking and the request signal 53 for the processing in the first color processing section 17 are generated only once, that is, during image taking and color processing, respectively, so that no conflict in access occurs between them. Thus, it is only necessary to perform arbitration between the access by the second synchronous signal generator 8 and the other accesses. This arbitration can be easily effected by a well-known method, such as cycle stealing using a high-speed memory device.

Figure 18:
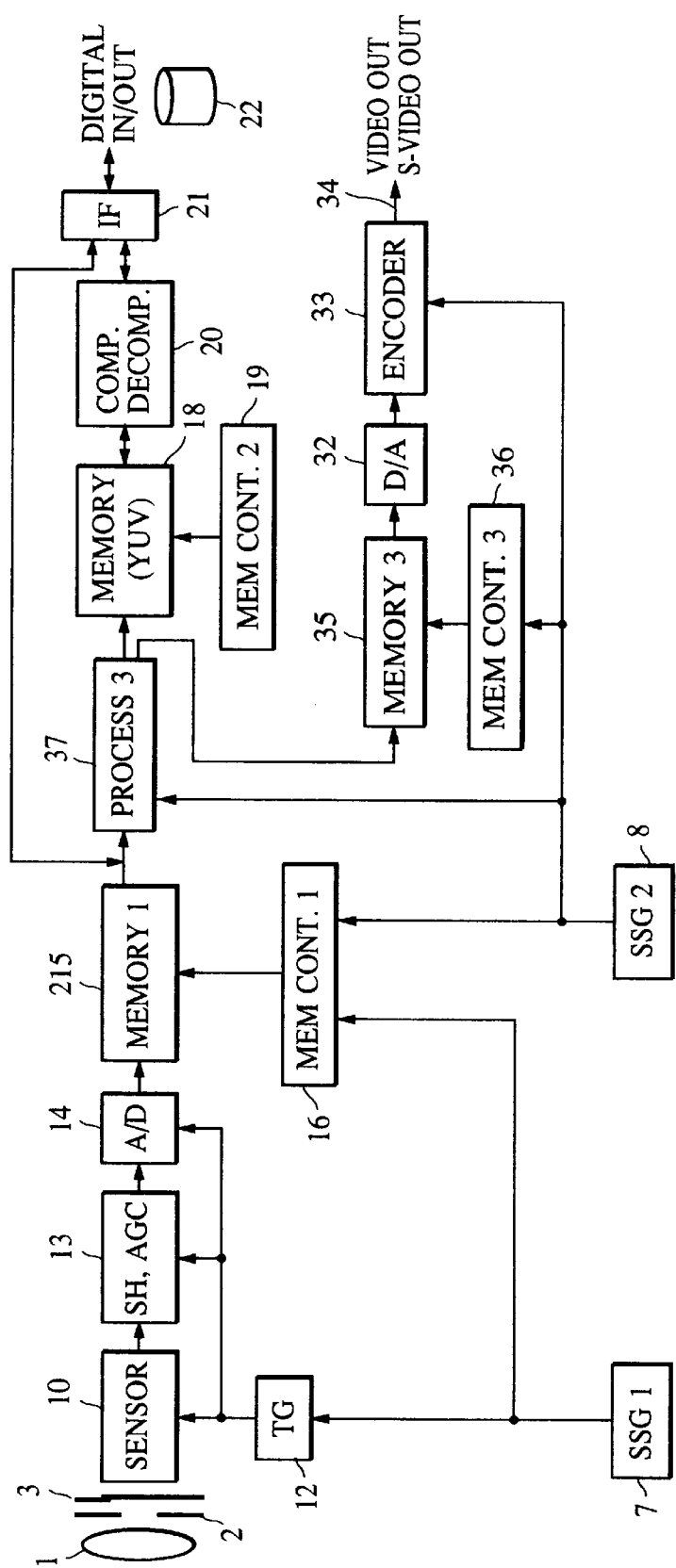
FIG. 18 is a block diagram showing an eighth embodiment of the present invention.

FIG. 18 shows the eighth embodiment of the present invention. In the drawing, numeral 35 indicates a third memory; numeral 36 indicates a third memory controller for controlling the third memory 35; and numeral 37 indicates a third color processing section for performing color processing. The third color processing section 37 has first and second color processing modes respectively corresponding to the first and second color processing sections 17 and 31, so that it is capable of color processing in both modes. This can be realized on a software basis by using a computation processor, such as DSP.

As in the case of FIG. 16, when the shutter 2 is opened, the sensor 10 is exposed, and driving pulses for the sensor 10 are generated by the timing generator 12 in accordance with the synchronous signal generated by the first synchronous signal generator 12. Then, the electric charge accumulated in the sensor 10 is read out, and subjected to sample-and-hold and AGC by the SH,AGC circuit 13 for removal of switching noise and extraction of signal component. The data thus obtained is converted to digital data by the 10-bit A/D converter 14, and stored in the first memory 215 under the control of the first memory controller 16. Here, the image data read out from the sensor 10 is stored in the first memory 215 as it is.

The image data stored in the first memory 215 is read as image data with its amount reduced to ½ both vertically and horizontally in accordance with the synchronous signal generated by the second synchronous signal generator 8, and subjected to color processing in the second color processing mode by the third color processing section 37 to the converted to luminance two-color difference (YUV) data before it is stored in the third memory 35. The luminance two-color difference (YUV) data stored in the third memory 35 is read by the third memory controller 36 in accordance with the synchronous signal generated by the second synchronous signal generator 8, and converted to an analog signal by the D/A converter 32. After this, it is modulated by the encoder 33 and output as the video signal 34 before it is displayed on a video monitor (not shown).

Next, all the image data is read out from the first memory 215, and subjected to color conversion in the first color processing mode by the third color processing section 37 to be converted to luminance two-color difference (YUV) data, which is stored in the second memory 18 for YUV. The image data converted to luminance two-color difference (YUV) data is compressed by the compression/expansion section 20 as needed, and converted into the file of the storage device 22 through the interface 21.

Figure 19:
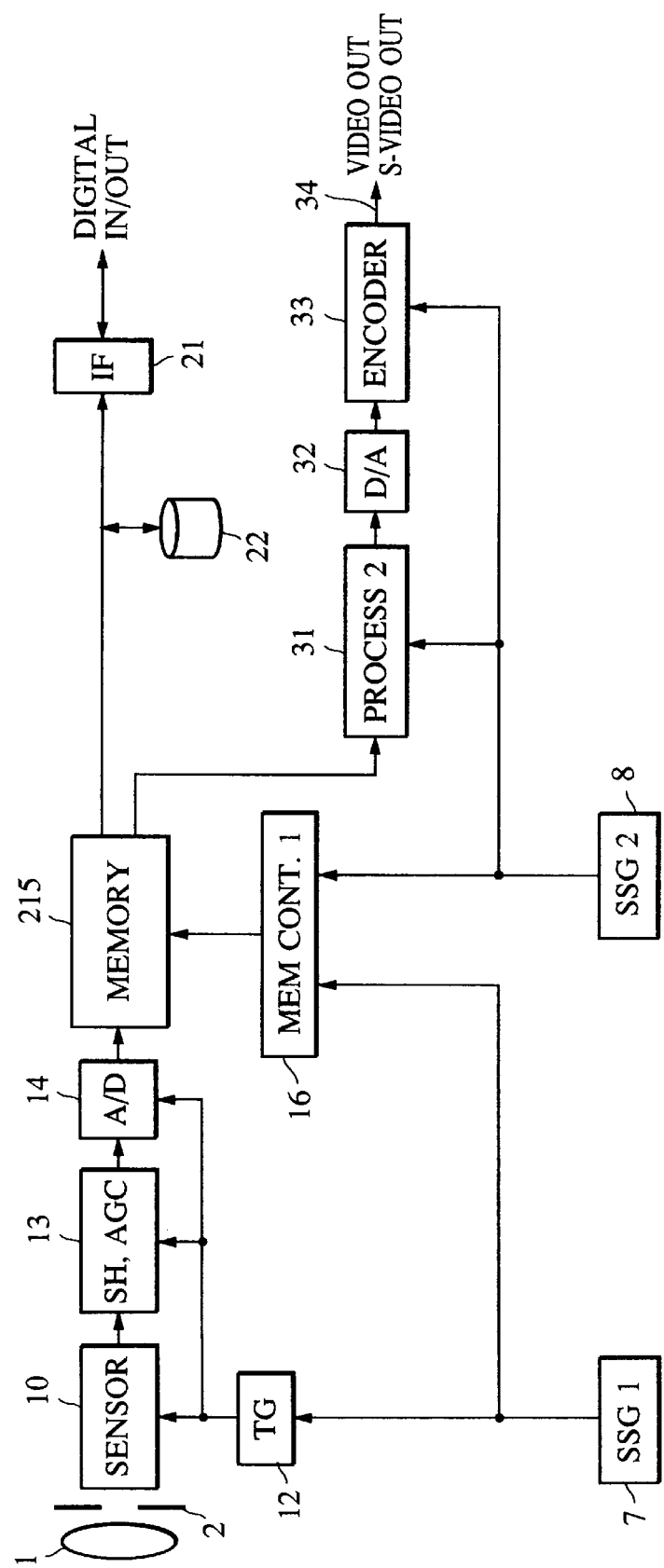
FIG. 19 is a block diagram showing a ninth embodiment of the present invention.

FIG. 19 shows the ninth embodiment of the present invention. In FIG. 19, no shutter is placed in front of the sensor 10, and the first synchronous signal generator 7 is constantly operating, with the sensor 10 constantly performing image taking. However, since the number of pixels of the sensor 10 is large, the image signal taken cannot be read at such a speed as in the case of ordinary NTSC or PAL video signals. It is read at a rate of approximately 15 frames per second. As in the case of he image signal read from the sensor 10 is transmitted by way of the SH,AGC circuit 13 and the 10-bit A/D converter 14, and stored in the first memory 215. In this case, data is read from the sensor 10 constantly and continuously, so that the first memory 215 is constantly updated with new image data.

The high resolution image stored in the first memory 215 and updated is read out, with the number of pixels reduced to 768×988, in accordance with the synchronous signal generated by the second synchronous signal generator 8, that is, the synchronous signal of an ordinary synchronous signal generator for television. The image data read out from the first memory 215 in synchronization with the synchronous signal of the second synchronous signal generator 8 is color-converted by the second color processing section 31, and transmitted by way of the D/A converter 32 and the video signal encoder 33 before it is output as the video signal 34.

Further, the image signal constantly taken by the sensor 10 is monitored by a video monitor (not shown) to which the above video signal 34 is supplied, and, at the same time, triggering is effected when necessary by manual operation (not shown) or the like to read the image data stored in the first memory 215 to convert it into the file or output it through the interface 21 as digital data to perform processing, such as color processing, in the exterior.

In still another embodiment, a number of taken images are stored in the file of the storage device 22 in FIGS. 16 and 19, and, prior to reproducing the images, they are temporarily stored in memory. This data is read in accordance with the second synchronous signal generator 8, and subjected to color processing by the second color processing section, whereby the checking and retrieval of the images filed by the images due to the output video signal 34 can be performed easily and quickly.

In accordance with the present invention, the image taking device is driven by the synchronous signal of the first synchronous signal generator, and the image signal thereby obtained is A/D-converted and temporarily stored in the memory. The image signal thus stored is read by the synchronous signal of the first synchronous signal generator and color-converted by the first color processing section. On the other hand, the memory is read with the synchronous signal of the second synchronous signal generator. Thus, even in the case of an image taking device consisting of a high-resolution sensor, it is possible to check an image immediately by a video monitor. Further, as compared to the case in which the high-resolution image is subjected to color processing as it is, the present invention is advantageous in that, due to the addition of a compact and inexpensive circuit, it is possible to immediately check the framing, the exposure of the taken image, focusing, etc. Further, when reproducing a number of taken images stored in a file, the filed image can be checked, retrieved, etc. easily and instantly by using a video monitor before this file is read out and subjected color processing to be reconstructed as a picture.

What is claimed is:

1. An image sensing apparatus comprising:

optical-axis deflecting means for deflecting an optical axis of an optical system;

image sensing means for converting an image formed by the optical system on an image sensing plane to an image signal;

first signal processing means for performing a first predetermined signal processing on the image signal output from said image sensing means, the first predetermined signal processing including storing the image signal in a first memory;

second signal processing means for causing said optical-axis deflecting means to deflect the optical axis to a plurality of positions and for performing a second predetermined signal processing for combining the image signals on the image signals output from said image sensing means corresponding to a plurality of deflected positions of said optical-axis deflecting means, the second predetermined signal processing including storing the combined image signals in a second memory;

mode selecting means for selecting a first signal processing mode causing said first signal processing means to perform the first predetermined signal processing and a second signal processing mode causing said second signal processing means to perform the second predetermined signal processing; and control means, in the second signal processing mode, for causing said second signal processing means to perform the second predetermined signal processing and outputting an image signal output from said first memory of said first signal processing means during performing of the second predetermined signal processing by said second signal processing means using said second memory.

2. An image sensing apparatus according to claim 1, wherein, in the first signal processing mode, said image sensing means reads image signals corresponding to two vertically adjacent lines and outputs a signal obtained by adding image signals corresponding to two vertically adjacent pixels, and, in the second signal processing mode, said image sensing means outputs a signal for each pixel, without performing addition of image signals.

3. An image sensing apparatus according to one of claims 1 and 2, wherein said image sensing means comprises an image sensing device and a complementary color mosaic filter.

4. An image sensing apparatus according to one of claims 1 or 2, wherein said image sensing means comprises a CCD.

5. An image sensing apparatus according to one of claims 1 or 2, wherein said optical-axis deflecting means comprises a variable-apex-angle prism.

6. An image sensing apparatus according to one of claims 1 or 2, wherein said optical-axis deflecting means comprises means for shifting a lens.

7. An image sensing apparatus according to one of claims 1 or 2, wherein said optical-axis deflecting means comprises a parallel-plate rotating system.

8. An image sensing apparatus according to claim 1, wherein the optical system and said image sensing means are selectively separable from said first and second signal processing means while being connectable together through a cable.

* * * * *

UNITED STATES PATENT AND TRADEMARK OFFICE
CERTIFICATE OF CORRECTION

PATENT NO. : 6,018,363

DATED : January 25, 2000

INVENTOR(S) : HIROYUKI HORII

It is certified that error appears in the above-identified patent and that said Letters Patent is hereby corrected as shown below:

<u>IN THE DRAWINGS</u>
Sheet 16, Figure 17, "ARBITORATOR" should read
--ARBITRATOR--.

<u>COLUMN 3</u>
Line 49, "shift," should read --shift.--; and
Line 55, "through 11," should read --through 8,--.

<u>COLUMN 4</u>
Line 20, "on" should read --of--;
Line 22, "on" should read --of--;
Line 25, "on" should read --of--; and
Line 35, "on" should read --of--;

UNITED STATES PATENT AND TRADEMARK OFFICE
CERTIFICATE OF CORRECTION

PATENT NO. : 6,018,363

DATED : January 25, 2000

INVENTOR(S) : HIROYUKI HORII

It is certified that error appears in the above-identified patent and that said Letters Patent is hereby corrected as shown below:

COLUMN 5
Line 9, "a" (first occurrence) should read --an--; and
Line 11, "taking" should read --taking apparatus--.

COLUMN 8
Line 27, "to" should read --to output--.

COLUMN 10
Line 24, "a" (first occurrence) should read --an--.

COLUMN 11
Line 52, "in" should read --of--; and
Line 59, "in" should read --of--.

COLUMN 12
Line 7, "FIG; 2" should read --FIG. 2--.

UNITED STATES PATENT AND TRADEMARK OFFICE
CERTIFICATE OF CORRECTION

PATENT NO. : 6,018,363

DATED : January 25, 2000

INVENTOR(S) : HIROYUKI HORII

It is certified that error appears in the above-identified patent and that said Letters Patent is hereby corrected as shown below:

COLUMN 14
Line 60, "he" should read --the--; and
Line 66, "to" should read --to whether--.

COLUMN 17
Line 17, "take" should read --takes--.

COLUMN 20
Line 15, "he" should read --the--.

COLUMN 21
Line 2, "subjected" should read --subjected to--.

Signed and Sealed this

Thirteenth Day of March, 2001

*Attest:*

NICHOLAS P. GODICI

*Attesting Officer*          *Acting Director of the United States Patent and Trademark Office*